INVENTOR.
Harry Talmage Nichols.
ATTORNEYS.

Jan. 19, 1937.   H. T. NICHOLS   2,067,942
CROWN BLOCK FOR A HOISTING APPARATUS FOR A DERRICK
AND MEANS FOR REEVING A COMPOUND PULLEY
Filed Sept. 15, 1930   8 Sheets-Sheet 2

INVENTOR.
Harry Talmage Nichols.
BY
Edwin P. Corbett
ATTORNEYS.

Jan. 19, 1937.  H. T. NICHOLS  2,067,942
CROWN BLOCK FOR A HOISTING APPARATUS FOR A DERRICK
AND MEANS FOR REEVING A COMPOUND PULLEY
Filed Sept. 15, 1930  8 Sheets-Sheet 3

INVENTOR.
Harry Talmage Nichols.
BY
ATTORNEYS.

Jan. 19, 1937.  H. T. NICHOLS  2,067,942
CROWN BLOCK FOR A HOISTING APPARATUS FOR A DERRICK
AND MEANS FOR REEVING A COMPOUND PULLEY
Filed Sept. 15, 1930  8 Sheets-Sheet 4
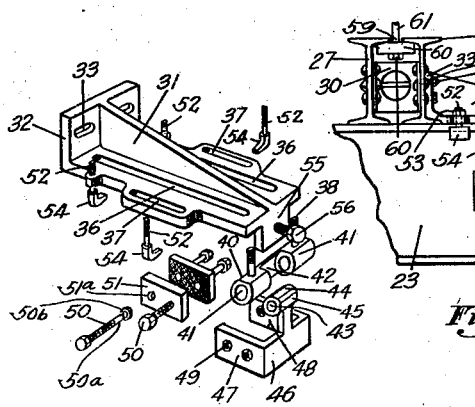
Fig. 9
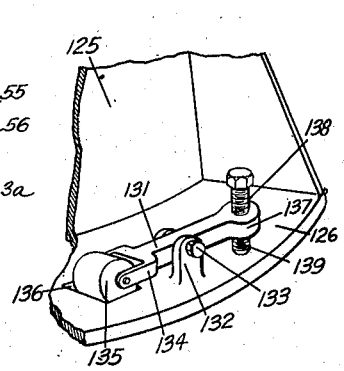
Fig. 14
Fig. 10
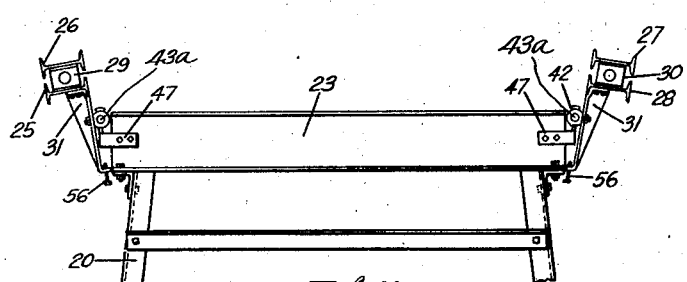
Fig. 11
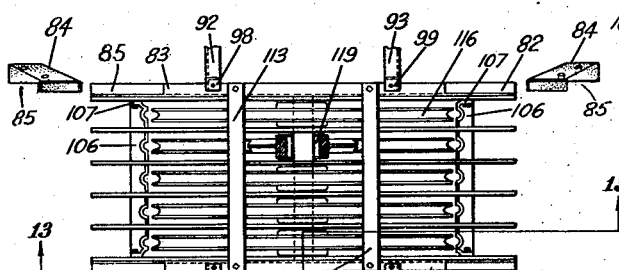
Fig. 12
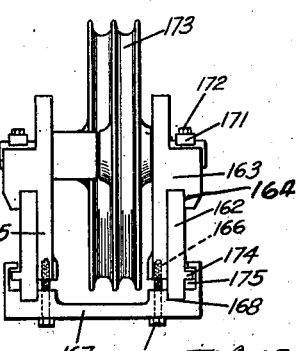
Fig. 15
Fig. 16
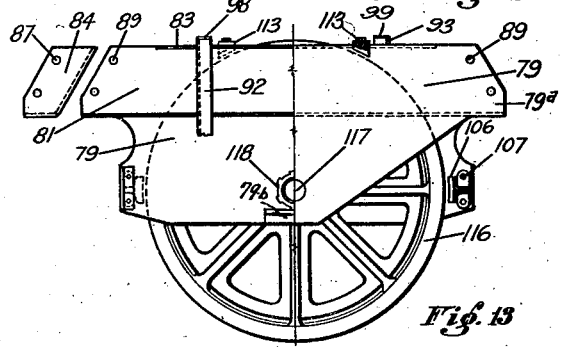
Fig. 13
INVENTOR.
Harry Talmage Nichols
BY
ATTORNEYS.

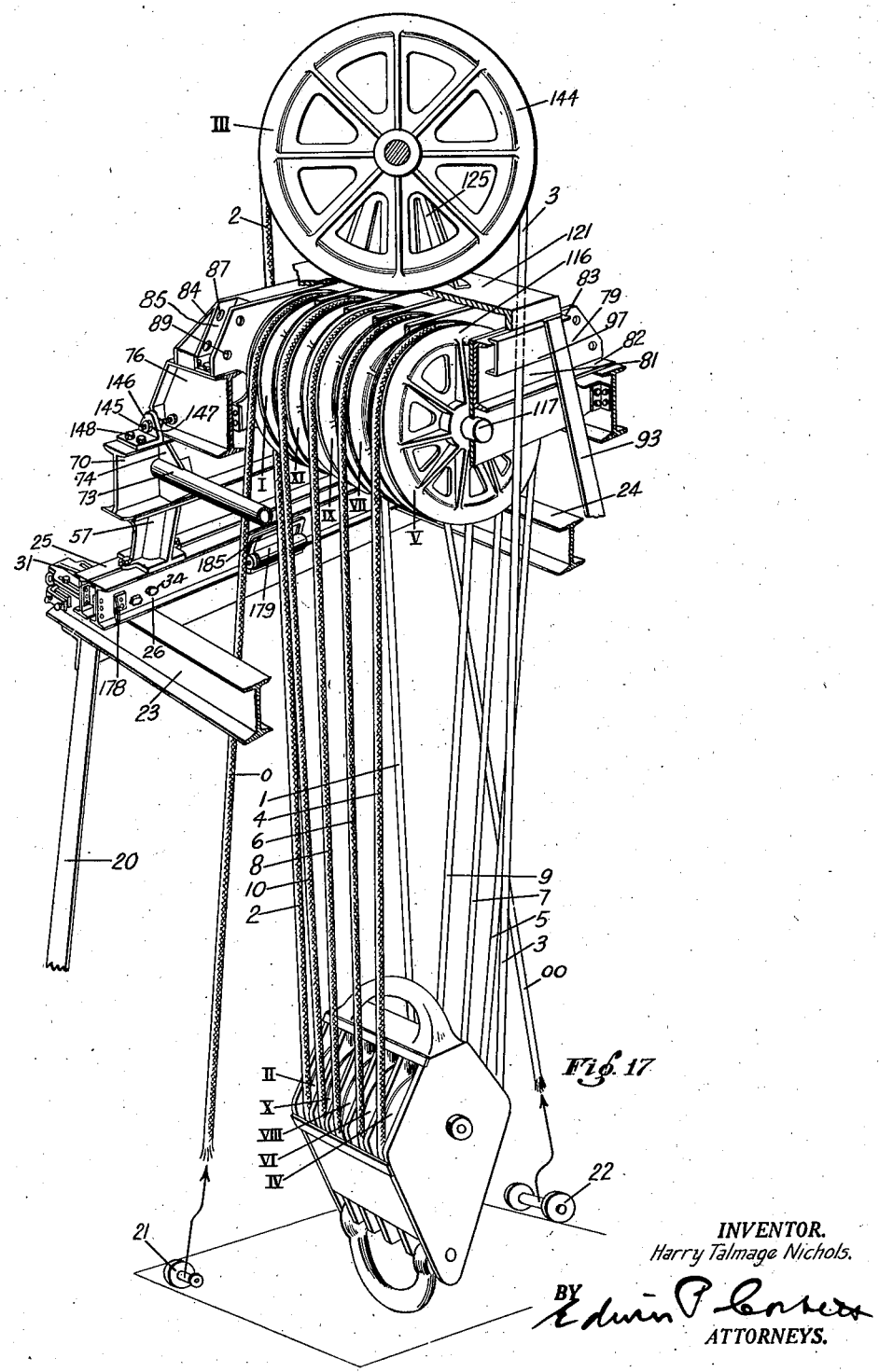

Jan. 19, 1937. H. T. NICHOLS 2,067,942
CROWN BLOCK FOR A HOISTING APPARATUS FOR A DERRICK
AND MEANS FOR REEVING A COMPOUND PULLEY
Filed Sept. 15, 1930 8 Sheets-Sheet 6

INVENTOR.
Harry Talmage Nichols
BY
ATTORNEYS.

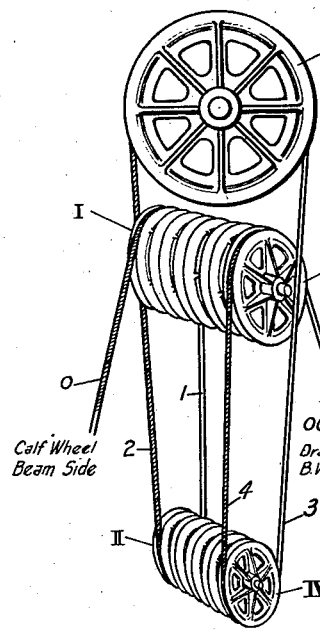
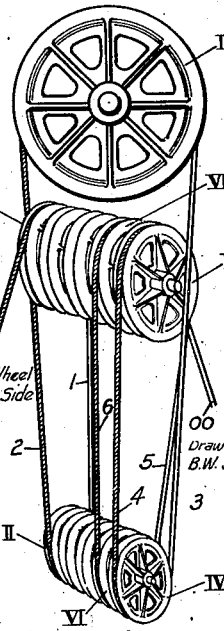
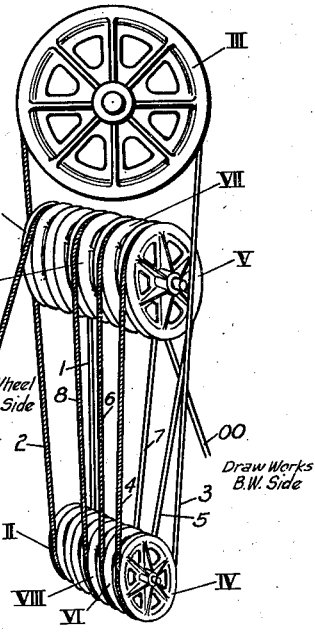
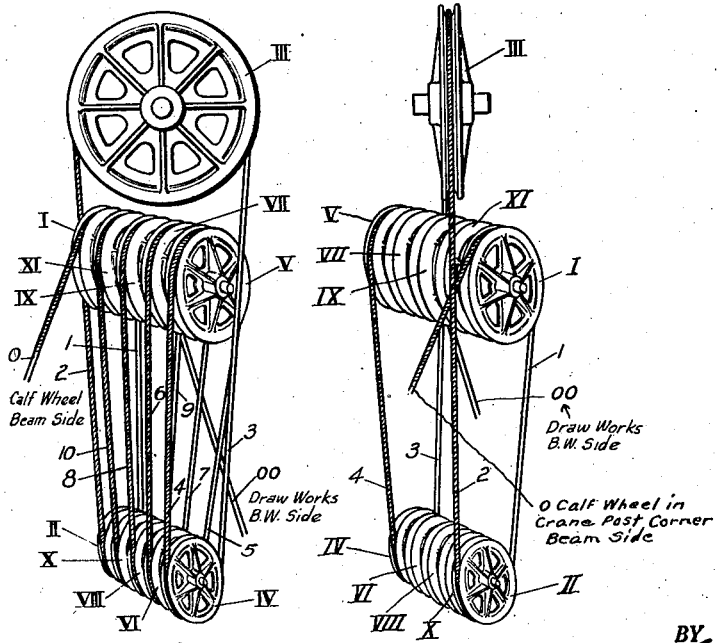

Jan. 19, 1937. H. T. NICHOLS 2,067,942
CROWN BLOCK FOR A HOISTING APPARATUS FOR A DERRICK
AND MEANS FOR REEVING A COMPOUND PULLEY
Filed Sept. 15, 1930 8 Sheets-Sheet 8
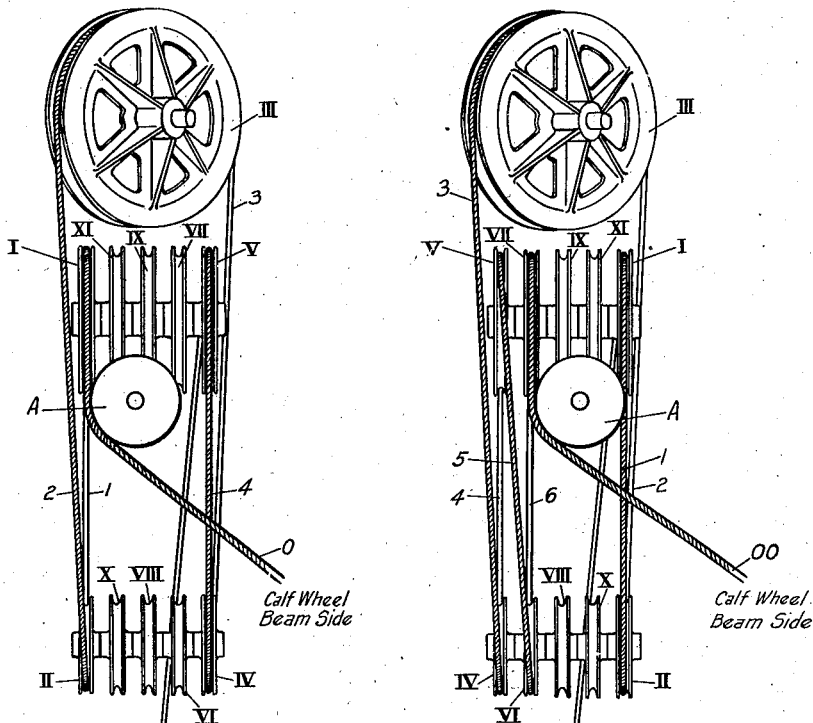
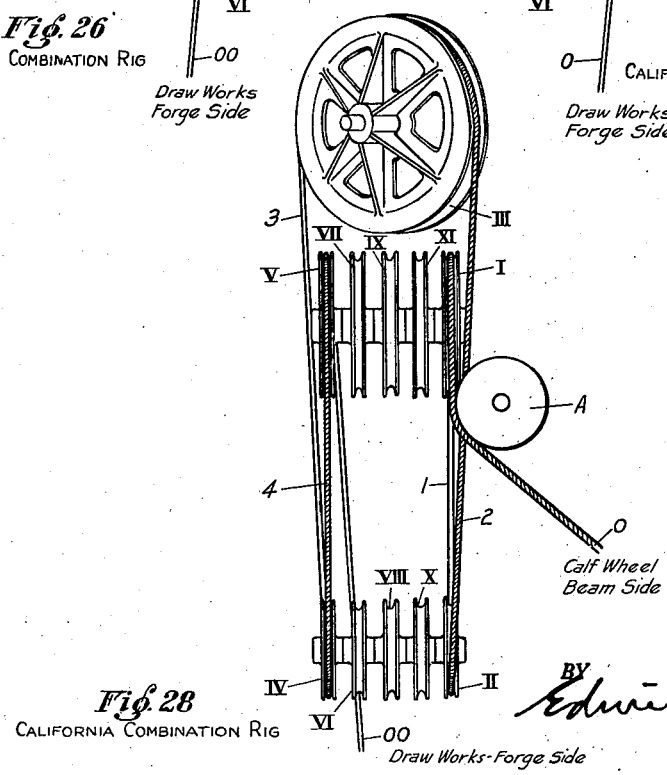
*INVENTOR.*
Harry Talmage Nichols
BY
*ATTORNEYS.*

Patented Jan. 19, 1937

2,067,942

UNITED STATES PATENT OFFICE 2,067,942

CROWN BLOCK FOR A HOISTING APPARATUS FOR A DERRICK AND MEANS FOR REEVING A COMPOUND PULLEY

Harry Talmage Nichols, San Antonio, Tex.

Application September 15, 1930, Serial No. 481,935
Renewed June 3, 1935

102 Claims. (Cl. 254—190)

My invention relates to a crown block for a hoisting apparatus for a derrick and means for reeving a compound pulley therein. It has to do, particularly, with a compound pulley especially adapted for use in connection with the drilling of wells although it is not necessarily limited thereto.

In the past the use of compound pulleys embodying fixed or standing block units, and running or traveling block units, with a multiplicity of parts or plies of a hoisting line rove to the sheaves thereof has been subject to certain serious disadvantages, partly due to the manner of mounting the sheaves thereof with relation to each other and partly due to the method of reeving the hoisting line therethrough.

One of these disadvantages has been the inability to obtain a balanced arrangement effective to ensure that the traveling block will not tilt during operation.

This tilting tendency is scarcely noticeable in a two-sheave traveling block, due to the proportionate rotational speed of the sheaves of two to one with four running parts rove and the standing part secured other than on the tackle block, and of five to three with five parts rove including the standing part secured to the tackle block, inherent when the block is rove with the parts of a line in direct sequence and is operated by a pulling force applied to the fall part of the line.

In a three-sheave traveling block, however, when rove with the parts of a line in direct sequence from one outer sheave to an intermediate sheave and thence to the other outer sheave, and operated by a pulling force applied to the fall part of the line, this tilting tendency is distinctly operative and correspondingly disadvantageous, due to the greater divergence in the proportionate rotational speed of the outer sheaves.

This disadvantage, which is cumulative in proportion to the number of sheaves thus rove, has, in all apparatus comprising more than two sheaves in the traveling block and which has been adaptable to and hitherto utilized in well drilling practice, resulted in seriously retarding and interfering with the speed of drilling operations.

During certain phases of the drilling operations the traveling block is raised from a position adjacent to the floor of the derrick to a position adjacent to the top thereof without a load, and, conversely, during other phases of the operations it is lowered from the top of the derrick without a load.

It is when the traveling block is operated without a load, and particularly when it is being lowered without a load, that this disadvantage is most acutely experienced, it being necessary to restrict the speed of operation in order to prevent the traveling block from excessive swaying and even from capsizing and fouling the parts of the hoisting line extending from its sheaves.

Efforts to correct this tilting tendency in the traveling blocks of apparatus hitherto utilized in drilling practice, by first reeving the outer sheaves of the traveling block, have resulted in the crossing of the parts of the line in such a manner as to set up a destructive chafing between the parts rove and in producing a "fleeting angle" between the rope grooves of the sheaves and the parts of the line extending therefrom destructive to both.

Another disadvantage is that in all compound pulley structures and methods of reeving heretofore utilized for the reeving of more than four running parts, the traveling block could not be made to hang in the center of the well, except when all of the compound pulley sheave members of both the crown and traveling block were fully rove, without resorting to shifting of the position of the crown block with respect to the center of the well, so as to unfairly load the derrick.

A further disadvantage has arisen from the fact that the structures and methods previously used result in excessive side diversion of the line from the rope grooves of the majority or all of the compound pulley sheaves.

Another disadvantage has arisen from the fact that the structures and methods of reeving previously utilized have of necessity, limited the diameter of some of the compound pulley sheaves, either in the crown block or traveling block or in both, and thereby caused excessive bending stresses in the hoisting line which are particularly productive of excessive wear and tear upon the wire rope which is ordinarily used for this line.

Other disadvantages have been present in prior art structures, as will appear as this description progresses.

One of the objects of this invention is to provide a crown block for a hoisting apparatus embodying a compound pulley of such structure and so rove that a maximum balanced effect will be produced, so that tilting of the traveling block will be reduced to a minimum, and so that the said tilting tendency in a traveling block having three or more sheaves, when operated by a pulling force applied to one end of a single line, is not substantially greater than the tilting tendency inherent in a two-sheave traveling block when so operated, irrespective of the number of sheaves, in excess of two, rove and operated.

Although hoisting apparatus has heretofore been utilized in industries other than oil well drilling in which the traveling block was effectively balanced, and in which the "fleeting angle" of the parts of the flexible element rove, such as fiber ropes, chains, and wire hoisting cables, with respect to the sheaves from which they extend was effectively eliminated, and undue wear and tear on the element rove was absent, all such apparatus hitherto utilized lacked the requisite combination of factors in their structure and method of reeving which would permit them to be adapted to, and incorporated into, well drilling practice, as developed during the evolution thereof to its present status.

For instance, apparatus and methods of reeving heretofore utilized, in which the factor of "fleeting angle" was not harmfully prevalent and in which the traveling block was effectively balanced, contemplated and provided means only adaptable to be fully rove.

This is very undesirable in hoisting apparatus for use in well drilling, since, at the outset of the drilling operations, the load to be hoisted is relatively light, and speed of operation of the apparatus by reeving a minimum number of parts of the line between the crown block and the traveling block is the objective sought.

Another object of my invention is to provide a structure and method of reeving whereby a minimum of four running parts of the line may be rove and the apparatus operated with the traveling block effectively balanced and with all of the parts then rove extending from the sheaves in substantial parallelism with the grooves thereof.

Another object of my invention is to provide a structure and method of reeving in which it is feasible and convenient to progressively reeve the apparatus as required in the progress of the drilling operation by adding other parts to the minimum of the parts which serve to initially reeve and balance the traveling block.

Still another objection to all previously known and utilized structures and methods of reeving in hoisting apparatus, in which the traveling block operated in an effectively balanced condition and in which the flexible element rove between the fixed block and the traveling block extended from the sheaves in substantially parallel relation with respect to the grooves thereof, and a serious objection, is that the flexible element was either endless and, therefore, inadaptable to well drilling practice, or the ends could not be "fair led" off from over sheaves in the fixed block (equivalent to the crown block) to winding drum means and to anchorage means as disposed in the various conditions existent in well drilling outfits.

These anchor means are sometimes disposed on the traveling block, sometimes on another winding drum, and sometimes consist of a base sill of the derrick structure or means attached thereto.

An object of my invention is to provide a hoisting apparatus of such structure and so rove that, when utilized in combination with the conventional well derrick and with the combinations of winding drums and anchorages utilized therein, whether it be rove with a minimum of four running parts of the hoisting line, or rove with an intermediate number of parts of the line of more than four and less than the capacity of the compound pulley sheaves of the blocks, or fully rove, the ends of the hoisting line may always be fair led off from over sheaves in the crown block to the respective hoisting drums and anchorages below, the traveling block will always be effectively balanced and will always operate in the same predetermined vertical path, and a majority or all of the parts of the hoisting line between the sheaves of the crown block and the sheaves of the traveling block will always be substantially parallel to the grooves of the sheaves from which they extend.

Another object of this invention is to provide a hoisting apparatus embodying a compound pulley of such structure and so rove that excessive side diversion on the sheave members thereof will be substantially eliminated and that all excessive bending stresses in the line will be eliminated.

The foregoing exposition of the disadvantages of the constructions and methods of reeving heretofore utilized is substantially identical with the exposition of the same subject in my co-pending application for United States Letters Patent Serial No. 215,059, filed August 24, 1927, of which this present application is a continuation in part, and applies to all devices known and utilized before the invention which is the subject of my said application, the general objects of the present invention being substantially identical with the general objects of the invention covered by the said application.

However, in conforming to the principles of that invention, I resorted to pivotally mounted sheaves in one or the other of the blocks of the apparatus in order to provide a structure in which the majority or all of the compound pulley sheave members in both the crown block and the traveling block might be of relatively large diameter and in order to utilize my method of reeving in such a manner as to effectively balance the traveling block, to obviate excessive "fleeting angle", or side diversion, of the running parts of the hoisting line between the blocks relative to the grooves of the sheaves from which they extend, and in order to fair lead the standing part and fall part of the hoisting line off from over compound pulley sheaves in the crown block to winding drums and anchorage means as disposed in practice in well drilling rigs.

Another object of this invention is to provide an extremely simplified hoisting apparatus of such structure and so rove that it will be feasible to have all of the compound pulley sheave members of large diameter in both the crown block and traveling block, while at the same time providing means whereby a traveling block having more than two sheaves may be balanced and centered under all conditions of operation and regardless of the number of plies rove, which has hitherto been impossible in the art, without resorting to a structure embodying pivoted sheaves in the apparatus.

Although, throughout the accompanying drawings, I have shown a traveling block with sheaves substantially smaller than those shown in the crown block, it will be obvious that the invention lends itself, without structural change or re-arrangement, to the utilization of sheaves in the traveling block equal in diameter to the parallel sheave members of the crown block.

In this connection, an important consideration with reference to this present invention, from an economic standpoint, is that it permits the utilization of sheaves of different diameters in the traveling block; and, consequently, enables the securing of the ultimate in service from partly used traveling blocks having relatively small sheaves and, when such blocks are discarded, enables the utilization of new traveling blocks having sheaves of large diameter.

Other objects of this invention will appear as this description progresses.

In order to clarify and qualify the meaning of some of the terms employed, which are believed to be peculiar to well drilling practice, it is desired to here define the sense of "dead line" and "running part" as applied herein to the compound pulley hoisting line.

In the original American standard cable-drilling rig, after the introduction of sheaves in the crown block thereof intended especially as compound pulley sheaves, commonly known in well practice as the "casing" sheaves, the standing part of the compound pulley hoisting line was usually and generally led off from over a compound pulley sheave in the crown block and secured to the traveling block, and the end of the part so secured was known as the "dead end".

When so secured, the standing part passes through the groove of but one rotating sheave, i. e. through the groove of and over a sheave in the compound pulley sheave assembly in the crown block; however, all line parts move in either an up or down direction.

In the later American hydraulic rotary-drilling rig, the "dead end" was secured sometimes as in the practice in the standard cable-drilling rig; and again, sometimes, the "dead end" was led off from over a compound pulley sheave in the crown block and, instead of being secured to the traveling block structure, was anchored to a base sill of the well derrick structure, or otherwise secured independently of the traveling block.

Still later, with the advent of the combination standard cable-drilling-hydraulic rotary-drilling rig, the respective ends of the single hoisting line employed in the operation of compound pulleys as utilized in well practice were each secured to individual winding drums, so that one of said drums could preferably be used during the operation of the hydraulic rotary-drilling rig, while the other drum, in an emergency, could be employed; particularly, to prevent the loss of the "drill stem" of the rotary-drilling rig by "sticking" or "freezing" in the well during an enforced period of vertical immobility.

Under the last two specifically cited practices in well drilling a novel condition is produced:

The line part which extends off from over a sheave in the crown block and is the farthest line part extending between sheaves of the respective blocks from the fall part does not move per se in an up and down direction, but is taken up and shortened, and, conversely, is let out and lengthened from under a traveling block sheave, and is, therefore, throughout its extension between the crown and traveling block, stationary.

This line part is, for this reason, in well practice called the "dead line", and is in reality an extension of the standing part.

However, since this so-called "dead line" extends between a sheave in the standing block and a sheave in the running block it is, in the light of established terms, a "running part", and is so referred to herein throughout.

To further clarify, it will here be noted that in the description to follow the reference numerals applied to the running parts of the hoistened line will in their numerical order indicate the natural sequence of the reeving which naturally and logically is counted from the end of the hoisting line which is not freed from drum or anchorage means when changing the number of running parts or plies employed, such as reeving additional running parts or for unreeving some of the running parts to reduce the number employed. The terms "parts" and "plies" are used synonomously herein throughout.

The preferred embodiment of my invention contemplates the reeving of a single hoisting line through the compound pulley sheave members of the crown block and the traveling block by such a method that the traveling block may be suspended in a cradle formed by two loops of the line which are opposite each other, the component parts of which extend from the outer sheaves of the traveling block.

In other words, the traveling block is, in effect, suspended from points on the peripheries of two of the parallel compound pulley standing block sheave members, and from opposed peripheral points on complemental compound pulley sheave means disposed in fixed obliquely transverse relation to the first said sheaves so that the traveling block is practically suspended from the four corners of the crown block.

Furthermore, my method of reeving the line through the compound pulley sheave members of the crown block and the traveling block is such that these cradle loops are formed by four running parts of the hoisting line rove in direct sequence from an end thereof, which are substantially perpendicular to the axes of the sheaves from which they extend.

The result of this is that, whenever during the progress of the drilling operation it becomes necessary to reeve additional running parts of the line to the compound pulley sheave members, these additional plies will be rove to the intermediate sheaves of the traveling block and will, in nowise, interfere with either the balanced effect, or the centered position of the traveling block originally created by my described method of reeving four running parts of the hoisting line from an end thereof to produce the said loops.

The compound pulley elements which I utilize in the preferred application of my method comprise a crown block with a plurality of compound pulley sheave members therein and a traveling block having more than two sheaves suspended there-beneath by a single hoisting line rove with a multiplicity of running parts between the said sheaves of the crown block and the sheaves of the traveling block.

Preferably, the crown block comprises a plurality of compound pulley sheave members of more than two in number and arranged in vertical planes in parallel'sm to each other.

This crown block also preferably comprises a single compound pulley sheave member with a rigidly fixed mounting, which sheave member is disposed in a vertical plane obliquely crosswise of the said plurality of parallel sheaves in the crown block and in cooperative relation thereto.

This sheave is preferably located above the said plurality of parallel compound pulley sheave members.

Likewise, this oblique sheave is preferably so positioned that its vertical center is in a direct vertical line above the central vertical axis of the said plurality of parallel sheaves of the crown block and of the central vertical axis of the traveling block structure and is of such size that the running parts of a compound pulley hoisting line leading downwardly therefrom extend downwardly to diagonally opposite corners of the traveling block, and being so spaced and positioned as to avoid fouling of the said running parts with both the parallel compound pulley sheave members of the crown block and their supporting means, as well as with the standard cable-drilling rig sheave means and the supporting means therefor, when these latter sheaves are utilized.

Likewise, the location of this oblique sheave member is preferably such that the two running parts which extend downwardly therefrom are at equal distances from a vertical line passing through the central vertical axis of the traveling block.

In conjunction with the described compound pulley sheave assembly in the crown block structure, I preferably use a traveling block which comprises outer sheaves and one or more intermediate sheave members disposed in parallelism with each other, and also disposed in substantial parallelism with the plurality of parallel compound pulley sheave members of the crown block.

With this structure of crown block and traveling block, I preferably reeve my compound pulley sheaves in such a way that the first four running parts from an end of the rope are rove to two of the parallel compound pulley sheaves and the oblique compound pulley sheave member of the crown block and the sheaves of the traveling block in a manner to support the traveling block by two cradle loops which embrace the outer, or cheek, sheaves of the traveling block.

Furthermore though the running parts or plies in two diagonally opposite corners of the traveling block are not necessarily spaced the same distances from the central vertical axis of the traveling block throughout their length as the plies in the other two diagonally opposite corners of the traveling block, the ply in each corner of the traveling block is spaced substantially the same distance throughout its length from the central vertical axis of the traveling block as the ply in the corner diagonally opposite it.

The result is that one pair of diagonally opposite plies is balanced against the other pair of diagonally opposite plies and that a balanced and centered traveling block is produced by the initial reeving of the first four running parts from an end of the line.

When this condition is produced, reeving of additional running parts to the compound pulley sheave members of the crown block and traveling block can only be effected by reeving such additional running parts or plies to the intermediate compound pulley sheaves of the traveling block and crown block and, consequently, this additional reeving cannot disturb the balanced condition, and centered position of the traveling block.

Furthermore, my method and structure are such that the traveling block is not only balanced and centered as indicated above but the compound pulley sheave members of the crown block and of the traveling block are so disposed with relation to each other that the majority or all the plies or parts of the hoisting line are in substantial parallelism with the sheave grooves from which they extend, and the majority or all of these plies or parts are maintained in a substantially perpendicular relation to the axes of the said sheaves.

This results in a hoisting apparatus wherein the traveling block is balanced and is centered under all conditions of operation without shifting the crown block, while the "fleeting angle" of the parts of the line with respect to the majority or all of the sheaves from which they extend is such as to entirely obviate excessive side diversion and, consequently, wear upon the grooves of the sheaves and on the line rove is reduced to a minimum.

My invention is particularly important in connection with operations wherein at the beginning it is desirable to initially reeve a minimum of four running parts of the hoisting line to the compound pulley sheaves and to later during the operations add other running parts to the four initially rove, such as well drilling operations.

Therefore, my compound pulley sheave assembly in the crown block preferably comprises one or more sheaves in the plurality of parallel sheaves thereof additionally of the two which are utilized in combination with the fixed obliquely disposed sheave member thereof to accomplish the initial reeving which balances and centers the traveling block.

In conjunction with this compound pulley sheave assembly in a crown block which has more than two parallel sheave members in combination with sheave means obliquely crosswise of them, I preferably use a traveling block having more than two sheaves suitably mounted to form a symmetrical structure and having pin means to support a becket on the lower end thereof.

The position of the traveling block when operatively rove is preferably such that all of the sheave members thereof are in parallelism with the plurality of parallel compound pulley sheave members of the crown block, and the oblique sheave means of the crown block is disposed in the same obliquely transverse relation to the sheave members of the traveling block as to the parallel compound pulley sheave members of the crown block.

Another aspect of my invention consists in the fact that the compound pulley standing block unit and the supporting structure therefor in my novel crown block is so constructed that it may at will and with the greatest ease, using the same vertical spacing means, be assembled to conform to either the practice of arranging a combination standard cable-drilling hydraulic rotary-drilling rig with winding drums and anchorage means (or points) to receive the end of the fall part and the end of the standing part of the line of the compound pulley hoisting apparatus on adjacent sides of the base of the derrick structure, or to the practice of arranging said winding drums and anchorage means on opposite sides of said base.

In order to facilitate the fair leading of the fall part and the standing part of the rope off from over compound pulley sheaves in the crown block, to winding drum means and anchor means below, I may, if desired, provide an idler-pulley as a supplement to my novel compound pulley standing block unit in the crown block.

A still further feature of my invention consists of the provision of adjustable and detachable means for vertically spacing and supporting the compound pulley sheave members of the crown block and their supporting means per se a substantial distance above the level of the water-table beams of the derrick, which means is of such a structure that a substantially increased amount of head-room for the operation of the traveling block is provided while, at the same time, I am enabled, whenever it is desirable, to utilize the conventional standard cable-drilling rig simple pulley rope sheaves which may, at will, be introduced into the space thus created between the lower extremities of the compound pulley sheave assembly of the crown block and the tops of the water table beams of the derrick or removed therefrom independently of the vertical spacing means, and the supporting means per se of the first named sheaves, including the idler fair leader pulley and its supporting means.

These standard cable-drilling sheaves, as is well known in the art, comprise a drilling line sheave over which the drilling line carrying the percussion drilling tools of the standard cable-drilling rig operates, the actuating winding drum being known as the "bull wheels" in this rig.

This drilling line sheave of the standard cable-drilling rig is referred to by several different names, such as the "crown sheave", the "drilling sheave", the "spudding sheave" and the "derrick pulley".

The standard cable-drilling rig sheaves also comprise a "sand sheave" over which the "sand line" of the rig operates.

Normally, in the operation of the standard cable-drilling rig, a bailer, or sand pump, for the removal of the cuttings and mud accumulating in the well during the drilling operation, is attached to one end of the "sand line", while the other end thereof is attached to the "sand reel" of the rig, which is a winding drum for the actuation of this line.

These standard cable-drilling rig sheaves, which are merely simple pulleys, are disposed so that their peripheral grooves are adjacent to, or coincident with, the central plane of the well derrick between the ladder and forge sides thereof, and they are conventionally mounted between the same pair of beams which are usually and normally disposed directly on the water table beams of the derrick.

Moreover, these standard cable-drilling rig sheaves are disposed radially of a central point which is adjacent to, or coincident with, the central vertical axis of the derrick so that line parts leading off from points on their grooved peripheries lead fairly into the well bore, and that other line parts leading off from points on their grooved peripheries diametrically opposed to the first said points, extend in the case of the drilling line, downwardly inside the derrick structure to the shaft of the bull wheels upon which it is wound, while the "sand line" extends downwardly outside the derrick on the walking beam side thereof to the "sand reel" upon which it is spooled.

Sometimes, the sand line is freed from the bailer and utilized for relatively light, miscellaneous hoisting duty, while, in the organization of the work in some combination drilling rigs, the drilling line sheave is utilized for the "cat line" of the rotary drilling rig.

The preferred embodiment of my invention is shown in the accompanying drawings, wherein similar characters of reference designate corresponding parts, and wherein.

Figures 1, 2:
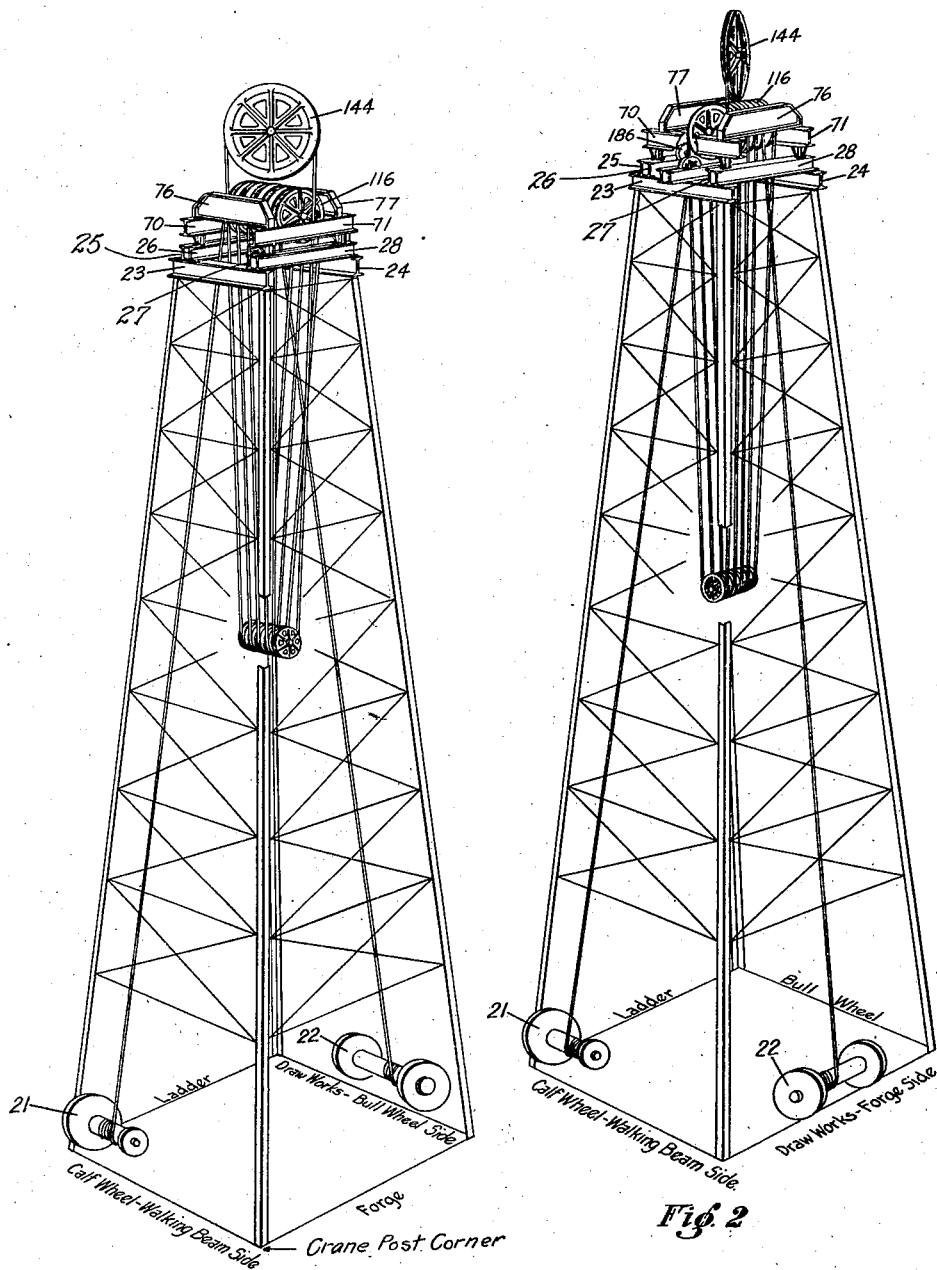
Figure 1 is a perspective view of a hoisting apparatus embodying my novel compound pulley and method of reeving applied with vertical spacing apparatus to a typical right hand steel oil well derrick wherein the calf wheel and rotary draw works are located on opposite sides of the derrick.
Figure 2 is a perspective view of a hoisting apparatus embodying my novel compound pulley and method of reeving applied with vertical spacing apparatus to a typical right hand steel oil well derrick wherein the calf wheel and rotary draw works are on adjacent sides of the derrick.
Figure 3:
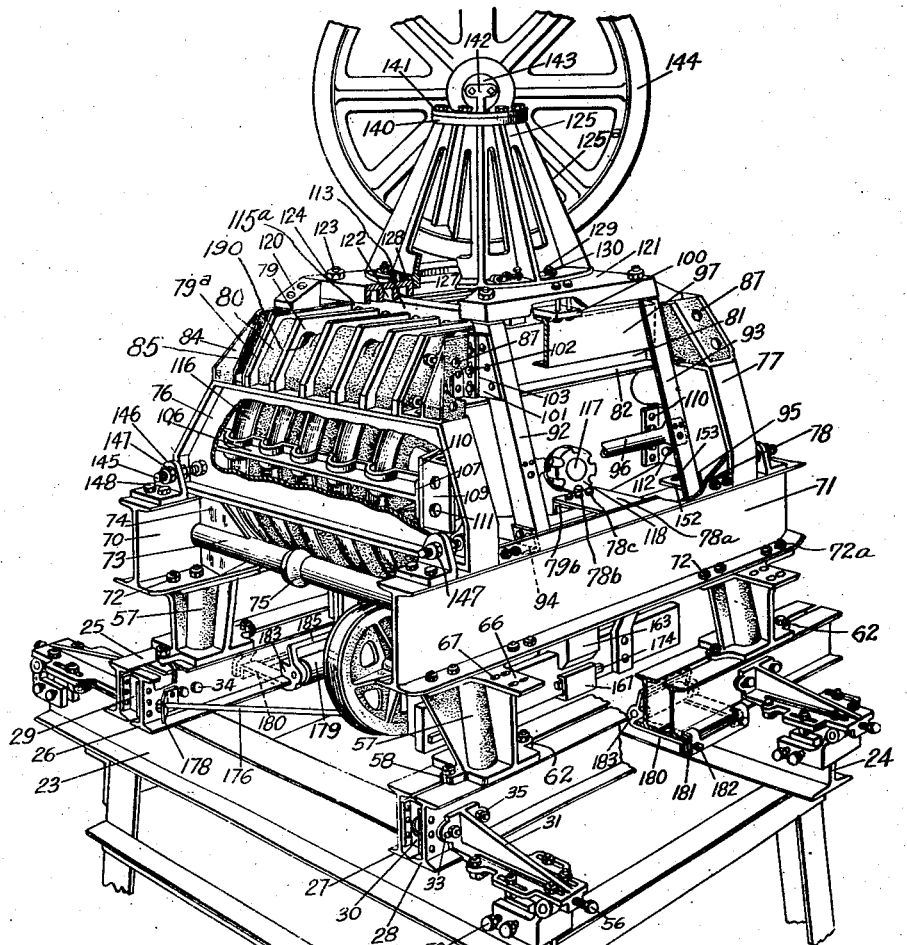

Figure 3 is a perspective view, with parts broken away, of a typical steel oil well derrick with my novel crown block structure, embodying my novel compound pulley standing block unit and vertical spacing apparatus therefor, together with my novelly supported standard cable-drilling rig sheaves installed at the conventional level, mounted thereon to conform to the well drilling rig practice wherein the ends of the compound pulley hoisting line lead downwardly off from over sheaves in the crown block to points on the opposite sides of the derrick base.

Figure 4:
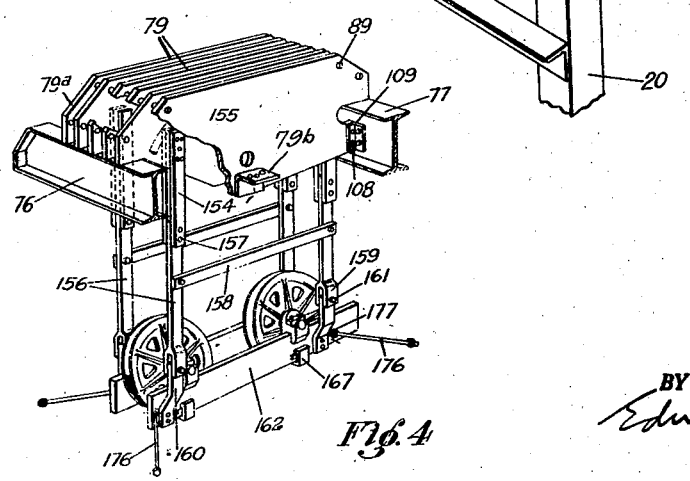

Figure 4 is a perspective view of my novel standard cable-drilling rig sheave supporting means which is designed to be removably applied to the structure shown in Figure 3.

Figure 5:
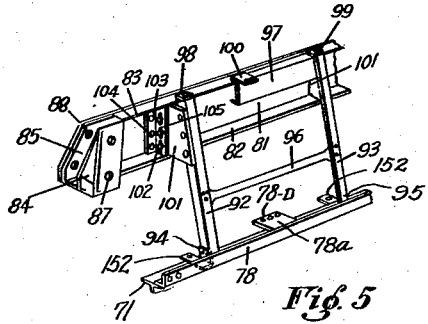

Figure 5 is a detail, in perspective, illustrating the structure of the leg members for supporting the oblique sheave member of the compound pulley unit of the crown block and the means for bracing the said legs from the parallel compound pulley sheave assembly structure.

Figure 6:
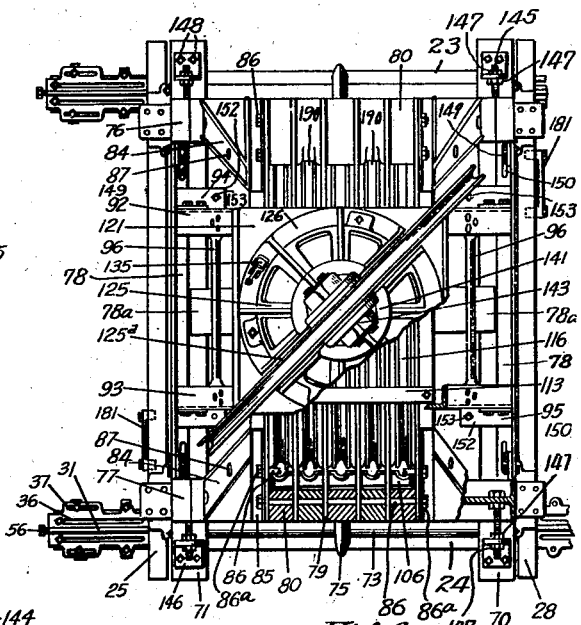

Figure 6 is a top plan view of the structure shown in Figure 3, with parts broken away.

Figure 7:
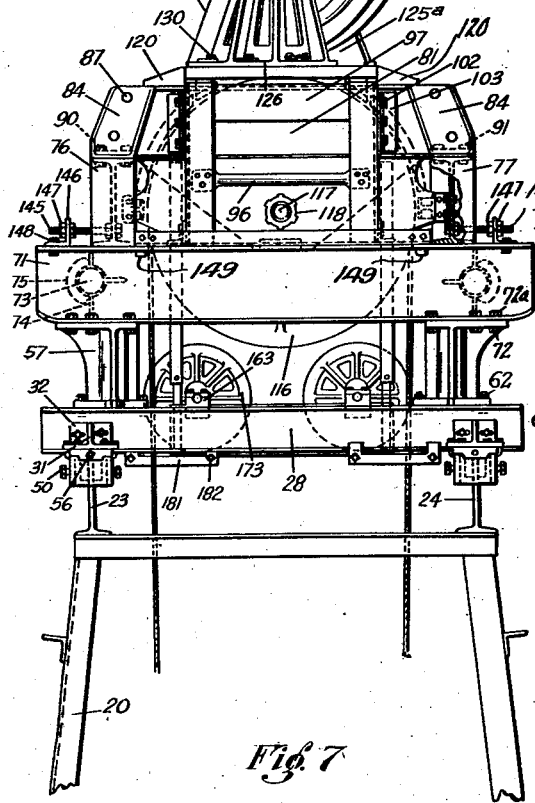

Figure 7 is a side elevation of the structure shown in Figures 3 and 6 and looking from the right of Figure 6.

Figure 8:
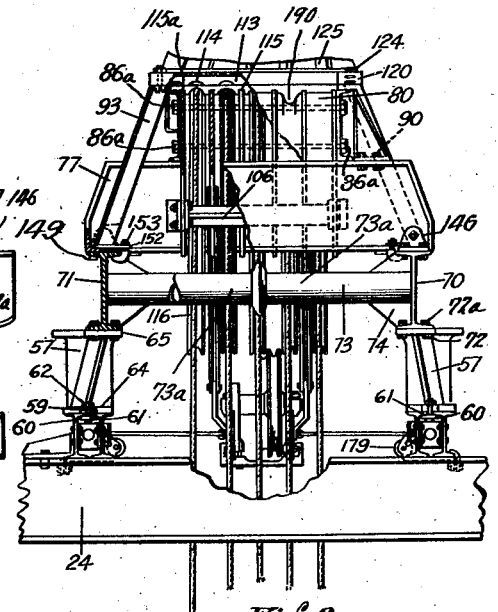

Figure 8 is an end elevation of my crown block structure with the oblique sheave removed and showing the parallel sheaves of the compound pulley unit of the crown block and the novelly supported standard cable-drilling rig sheaves.

Figure 9 is a detail, in perspective, illustrating the disassembled parts of one of the means which I have utilized to render possible the pivotal swinging of the base beam members of the vertical spacing apparatus, which supports struts to ultimately support the compound pulley standing block unit of the crown block above the level of the water table beams of a derrick.

Figure 10 is a detail in side elevation of the structure shown in Figure 9.

Figure 11 is a side elevation of the top of a typical steel oil well derrick which terminates in a pair of water table beams showing the beam members of my vertical spacing apparatus which are connected thereto by the pivotal means of Figures 9 and 10, these beam members being shown swung to clearance position.

Figure 12 is a plan view showing the beam plates assembled to support the parallel sheaves of the compound pulley standing block unit of the crown block with rope guards which at the same time function as beam plate stiffeners mounted on the tops thereof and disposed facing the grooved faces of the sheaves.

Figure 13 is a section taken on line 13—13 of Figure 12, looking in the direction of the arrow.

Figure 14 is a detail, in perspective, of anti-friction means for facilitating rotary adjustment of the preferred supporting means for my oblique sheave member.

Figure 15 is a view in end elevation illustrating one form of my novel beam and bearing struture for supporting the standard cable-drilling rig sheaves under the practice in which the ends of the compound pulley hoisting line are led to opposite sides of the derrick base.

Figure 16 is a detail, in perspective, of a portion of the structure shown in Figure 15.

Figure 17 is a perspective view partially broken away illustrating my novel compound pulley standing block unit mounted on the top of a typical steel oil well derrick and rove right-handedly in conjunction with a traveling block for use where the ends of the compound pulley hoisting line are led to opposite sides of the derrick base, and showing the increased head room provided above the level of the tops of the water table beams of a derrick for the traveling block.

Figure 18:
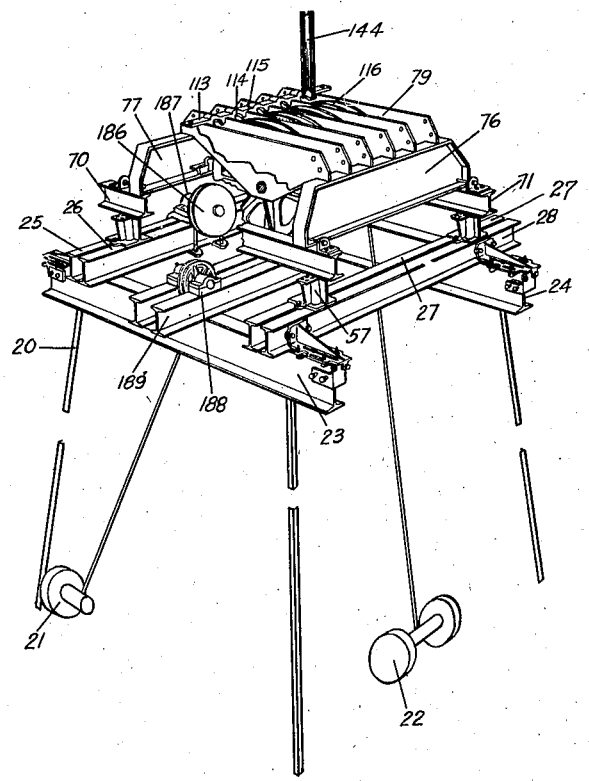

Figure 18 is a perspective view illustrating my crown block in position for use on a derrick wherein the ends of the compound pulley hoisting line lead to adjacent sides of the derrick base, this figure illustrating one position of the idler fair leader pulley.

Figure 18A:
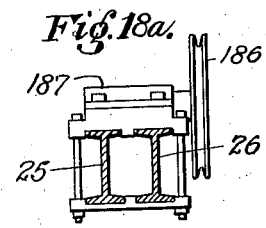
Figure 20:
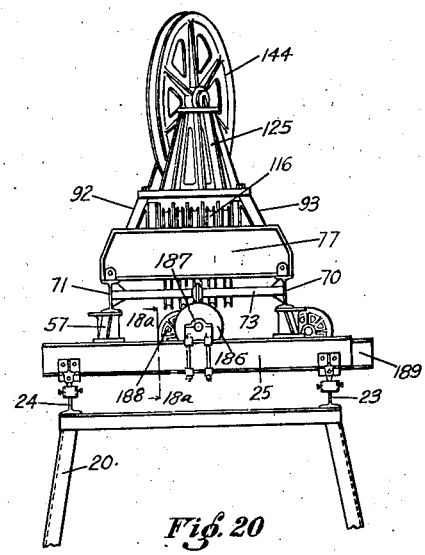

Figure 18a is an enlarged vertical transverse sectional view taken on the line 18a—18a of Figure 20, and illustrating a clamping structure which I preferably utilize to secure an idler fair leader in different operative positions.

Figure 19:
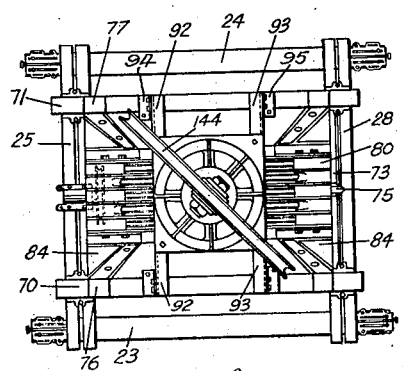

Figure 19 is a plan view of the structure shown in Figure 18.

Figure 20 is a side elevation of the structure shown in Figure 18, looking from the left of Figure 19.

Figure 21 is a diagrammatic view, in perspective, illustrating the compound pulley sheave members of my invention rove with four running parts of the hoisting line for use according to "mid-continent practice", that is, the practice wherein the ends of the compound pulley hoisting line are led to opposite sides of the derrick base.

Figure 22 is a diagrammatic view, in perspective, illustrating the compound pulley sheave members shown in Figure 21 rove with six running parts of the hoisting line.

Figure 23 is a diagrammatic view, in perspective, illustrating the compound pulley sheave members shown in Figure 21 rove with eight running parts of the hoisting line.

Figure 24 is a diagrammatic view, in perspective, illustrating the compound pulley sheave members shown in Figure 21 rove with ten running parts of the hoisting line.

Figure 25 is a diagrammatic view, in perspective, illustrating my invention adapted to left hand rig conditions for "mid-continent practice", wherein the ends of the compound pulley hoisting line lead to opposite sides of the derrick base, with four running parts of the hoisting line rove thereto.

Figure 26 is a diagrammatic view, in perspective, of the compound pulley sheave members of my invention with a supplementary idler fair leader pulley for use in California combination rig practice wherein the ends of the compound pulley hoisting line lead to adjacent sides of the derrick, four running parts of the line being shown rove.

Figure 27 is a diagrammatic view, in perspective, of the compound pulley sheave structure of my invention for use in California combination rig practice and illustrating the idler fair leader pulley adjusted to a different position from that shown in Figure 26, with six running parts of the hoisting line rove thereto, the freed end of the line in this reeving leading to the calf wheel on the beam side of the derrick base, instead of to the draw works on the forge side of the derrick as shown in Figure 26.

Figure 28 is a diagrammatic view, in perspective, of the compound pulley sheaves of my invention for use in California combination rig practice with four running parts rove, wherein the idler fair leader pulley is positioned on the same side of the derrick, as in Figure 26, but adjacent a different corner thereof and cooperating with the parallel sheave thereof nearest the calf wheel instead of the parallel sheave thereof farthest therefrom as in Figure 26.

That type of structure wherein the calf wheel and the rotary draw works are located on opposite sides of the base of the derrick, to wit, on the walking beam and bull wheel sides thereof, is generally referred to in the art as "mid-continent practice" and will hereinafter be thus referred to. Therefore, this term will be used in connection with the structure shown and described in Figures 1, 3, 4, 6, 7, 8 and 17.

That type of structure wherein the calf wheel and the rotary draw works are located on adjacent sides of the base of the derrick, to wit, on the walking beam and forge sides thereof, is generally referred to in the art as "California combination rig practice".

This term will be used in connection with Figures 2, 18, 19, and 20.

In the drawings, with particular reference to Figures 1 and 3 to 17, inclusive, I have shown my novel compound pulley standing block unit embodied in a crown block structure mounted upon a typical steel oil well derrick, supplemented by the calf wheel and rotary draw works arranged in accordance with the so-called "mid-continent practice".

The legs of the derrick may be generally designated 20, the calf wheel 21 and the rotary draw works 22.

The upper ends of the derrick legs are designed to support water-table beams 23 and 24 which constitute the horizontal head of the derrick and which may be of usual form.

My novel standing block structure, either with or without the vertical spacing apparatus which I preferably use in combination therewith, is designed to be ultimately carried and supported by a pair of water table beams such as 23 and 24.

The parallel sheave assembly of my novel compound pulley standing block, together with the supporting beam assembly, per se, in my novel crown block structure is designed to be elevated into operative position substantially as a unit, and it is preferably mounted upon spaced pairs of transverse beams 25—26 and 27—28, but may be mounted directly on the water table beams 23 and 24.

The beams 25—26 are preferably slightly spaced apart and secured together by end flange plates 29, while the beams 27—28 are likewise slightly spaced apart and secured together by end flange plates 30, as is best shown in Figure 10 of the drawings.

These pairs of transverse base members 25—26, and 27—28, are adapted to be mounted upon the water table beams 23 and 24 of a well derrick in different definitely spaced relations to each other, dependent upon the relation in which it is desired to assemble the parallel sheave members of the compound pulley standing block unit of the crown block with respect to the water table beams of the derrick, i. e., parallel to, or crosswise to, the water table beams.

These transverse beam members of the vertical spacing apparatus are attached to the water table beams by means of pivoted arms 31.

Each pivoted arm 31 is provided at one extremity with vertical flanges 32 having slots 33 formed horizontally therein for the reception of bolts 34 which are designed to extend through the two webs of each pair of beams, being held therein by means of nuts 35, as is best shown in Figure 10.

Each of these arms 31 is provided with pairs of slots extending longitudinally thereof, an inner pair 36 and an outer pair 37, as is best shown in Figure 9.

The slots 36 are adapted for the reception of upstanding stud bolts 38 threaded for the reception of nuts 39.

These stud bolts 38 are rigidly carried from the upper flat surfaces 40 of barrel members 41 which are joined together by a strip 42 to form one-half of a hinged structure.

The other half of this hinged structure is formed by a barrel 43 having an upper flat surface 44 and an outer vertical flat surface 45.

This barrel member 43 is rigidly supported upon a horizontally disposed U-shaped member 46 having side members 47 and 48 which are adapted to be disposed on either side of each of the webs of the water table beams 23 and 24.

The hinge is connected by the pin 43a which extends through the barrel members 41 and 43.

These members 47 and 48 are provided with threaded apertures 49 through which pass screw bolts 50, which latter terminate in reduced unthreaded portions 50a to pass through the holes 51a in the plates 51, which are slightly larger than the said unthreaded portion 50a to allow easy manipulation, and to receive the unthreaded rings 50b which may be riveted or otherwise secured thereon, to form a swiveling connection with the plates 51.

These bolts 50 may be adjusted to cause the plates 51 to firmly grip the webs of the water table beams 23 and 24.

The slots 37 of the member 31 are adapted for the reception of bolts 52 having their upper ends threaded for the reception of nuts 53, and having their lower ends hook-shaped, as at 54, to embrace flanges of the water table beams 23 and 24.

The adjustment of the spaced pairs of transverse beams 25—26 and 27—28 to or from each other is definitely limited and determined.

The means which I preferably utilize for effecting this limitation of movement of said spaced pairs of beams comprises a downwardly extending lug 55 on the outermost end of each arm 31, and a set screw, or bolt, 56 threaded through this downwardly extending lug for ultimate abutment with the flat surface 45 on each member 43 of the hinged structure.

Thus, when this set screw or bolt is once properly set in position on each of the arms 31, the adjustment of each of these arms, and, consequently, of each pair of transverse beams, is definitely and accurately stopped at the desired position.

The operation of this mechanism in the course of assembling my novel crown block structure will be explained hereinafter in the description of the assembly thereof on a typical oil well derrick.

I have conceived that, for several reasons, it is highly desirable that the compound pulley standing block unit in an oil well derrick crown block be so constructed and spaced above the water table beams of a derrick as to make available, at will, for different uses a substantial amount of space between lower extremities of the former and the tops of the latter.

For one thing, the inevitable variations which occur in the lengths of drill pipe sections render it highly desirable that the upper portion of the traveling block may be raised to a level higher than the tops of the water-table beams in order to accommodate the longer "stands" composed, in practice, with a factor of working clearance and safety.

The additional head room, so provided, for the operation of the traveling block will serve to prolong the usefulness of derricks which would otherwise be obsolete and require replacement by the next taller size in the series of standardized derricks now prevalent.

For another thing, in the use of rotary well drilling equipment, it frequently becomes desirable to utilize standard cable-drilling rig sheaves.

To facilitate these operations, I have provided a spacing structure which has, at least, two important functions:

For one thing, it spaces the compound pulley standing block unit of the crown block a sufficient distance above the water table so as to permit the traveling block to be raised to a position wherein its upper end extremity is above the level of the tops of the water table beams, as illustrated in Figure 17, thereby increasing the head room available for the operation of the traveling block, and, consequently, the safe, effective range of operation of the latter.

For another thing, my novel structure permits and facilitates the introduction and/or removal of the simple pulley standard cable-drilling rig sheaves and the supporting means therefor, immediately beneath the compound pulley standing block unit of the crown block, without disassembling any part of the supporting means of the latter, or without unreeving the parts or plies of the compound pulley hoisting line therefrom.

It is an important advantage of my novel crown block structure that the compound pulley sheave and beam assembly, and the idler fair leader pulley, when the latter is utilized in conjunction with the vertical spacing apparatus which I preferably provide therefor, always constitute a complete operative unit, under all conditions of assembly and operation; and, that in no case, either of assembly, reeving, or operation, is the standard cable-drilling rig sheave supporting structure, or any sheave carried thereby, requisite to the functioning and proper fair leading of the line parts of the compound pulley hoisting apparatus and conversely, no sheave carried by the compound pulley supporting structure per se is requisite to the proper functioning of either of the standard cable-drilling rig sheaves.

Another important advantage of my novel crown block structure is the provision of means to attach or detach, at will, a sheave supporting structure for the standard cable-drilling rig sheaves, including a "sand sheave" and a standard cable-drilling drilling line sheave, suspended beneath a compound pulley standing block unit, this feature being especially desirable when it is desired to mount the supporting beams, per se, of a compound pulley standing block unit directly on the horizontal head of a well derrick.

The spacing means which I preferably utilize for supporting the compound pulley sheave assembly of the crown block and supporting structure thereof, a substantial distance above the water table beams comprises struts 57; two of these struts being mounted on each pair of transverse beams 25—26 and 27—28, and each of which struts 57 is adjustable to and from the longitudinal center of said beams, for a purpose to be described hereinafter.

These struts 57 are secured to the pairs of transverse base beams 25—26 and 27—28 by means of slotted lugs 58 formed on their bases, as shown in Figure 3, and bolts 59 having heads disposed between the spaced units of each pair of transverse base beams, as best shown at 60 in Figure 8.

It will be seen that these heads are formed to have interfitting relation with the beveled interior surfaces of the upper flanges of these transverse base beams and that the shanks 61, of these bolts, project upwardly between the edges of the flanges of said base beams 25—26 and 27—28 and thence upwardly through the slots of the lugs 58 on the base of each strut.

Nuts 62, adapted to be threaded onto the shanks 61 of the bolts 59 to clamp the struts firmly in position upon these base beams, are provided.

The struts 57 are of somewhat eccentric form, in the sense that their upper ends are nearer the center line between the spaced pairs of transverse beams 25—26 and 27—28 than their lower ends.

Thus, as shown in Figure 8, the lower edges 64 of these struts are further removed from a vertical central plane between these spaced pairs of beams than the upper edges 65 thereof.

This insures that the running parts of the hoisting line extending downwardly from the fixed oblique sheave member of the compound pulley sheave assembly of the crown block, to be described, will have adequate clearance and will not foul against the inner edges of the pairs of base beams of the vertical spacing apparatus.

However, if desired, guarding rollers may be provided to further guard the parts of the compound pulley hoisting line against fouling these beams under all conditions of operation, even though the traveling block should be attached to a load eccentric to the well.

The upper ends of the struts 57 are of T-shape construction as shown at 66 in Figure 3.

The structure is such that the load imposed upon these struts by the base beams 70 and 71 of the compound pulley standing block unit is distributed thereto over a surface of unusual area.

Furthermore, the T-shape construction of the upper ends of these struts will permit of the ready assembly of the parallel sheave assembly unit of the compound pulley standing block unit of the crown block in a position at right angles to the position in which it is shown mounted in Figure 3, where the parallel sheaves are disposed crosswise to the water table beams, it being understood that the position of these parallel sheave members upon the derrick as shown in Figure 3 represents the position which I preferably utilize in "Mid-Continent practice"; while, for California combination rig practice, the parallel compound pulley sheaves are assembled in a position at right angles to that position, i. e., with their plane face sides in parallelism with the water table beams of the derrick, as shown in Figures 2, 18, 19 and 20.

In this connection, it will be noted that bolt holes 67 are provided so that this supported structure, to be described, may be readily secured to the struts in either assembly.

The compound pulley standing block unit is preferably constructed with two base supporting beams 70 and 71 which are designed either to be supported directly on the water table beams, or to be bolted by means of bolts 72 and the nuts 72a to the upper ends of the struts 57, when they are used with my vertical spacing structure.

These beams 70 and 71 are held apart and secured together by means of a plurality of beam spreaders such as is designated by the numeral 73; these beam spreaders, as is shown, being welded at their ends to the beams 70 and 71, and additional bracing effect being secured by the provision of wing plates 74 upon the beam spreaders, which latter are welded both to the spreader and to the beam.

The beam spreaders 73, although shown without a joint along their length, may be provided with one or more flanged joints therealong to facilitate disassembling into lighter and smaller units for packing for shipment, or for field transportation under difficult circumstances ofttimes obtaining in oil fields. This would not entail the sacrifice of rigidity.

The beam spreaders 73 have portions, as at 73a—73a, devoid of angles capable of causing injury to a snubbing rope when same is paid out therefrom, constituting snubbing post or bitt means for bitting a snubbing rope, and they are further provided with centering lug members 75 which serve to center the bight or vertex of a snubbing rope which may be snubbed or bitted on the portions 73a during the hoisting of the parallel sheave assembly of the compound pulley standing block unit of the crown block into operative position on a derrick, in a manner that will be more fully described hereinafter.

The structural features of the preferred form of the compound pulley standing block unit of my crown block further comprise intermediate transverse beams 76 and 77 which are spaced apart and secured together at their lower ends by means of angle irons 78.

The part of this unit which embodies the plurality of parallel sheaves, and which is best shown in Figure 4 of the drawings, is so constructed that ears formed on the ends of the supporting beam plates thereof project over and are supported by and upon the upper flanges of these intermediate transverse beams 76 and 77.

This construction produces a more than adequate support for the beam plate assembly shown in Figure 4.

The beam plate assembly shown detached in Figure 4, and incorporated in Figures 3, 6, 8, 12 and 13, comprises a plurality of spaced beam plates 79 which are designed to be spaced apart at their ends by spacer blocks 80, best shown in Figures 6 and 8.

The outer beam plates 79 have, welded thereto, channel members 81 having flanges 82 and 83.

The flanges 83 are cut off adjacent their ends so that these channel members may be supplemented by castings 84, as best seen in Figures 12 and 13.

These castings 84 are welded to the channel members 81 and are made with an opening at 85, so that ready access may be had to the nuts 86a (Figures 6 and 8) of the bolts 86 for the proper manipulation thereof.

The castings 84 are further provided with apertures 87 in alignment with the apertures 88 in the channel members and these apertures 88 in the channel members are also in alignment with the apertures 89 in the outer beam plates and the intermediate beam plates which permit the ready insertion and removal of the bolts 86.

The bolts 86 thus serve to hold the beam plates 79 and channels 81, and the separator elements 80 together as a unit, and the castings 84, being welded to the channel members, also form an integral part of this assembly.

The assembly as a whole is secured to the intermediate transverse beams 76 and 77 by means of bolts 90 and 91, as in Figures 7 and 8.

It will be noted that the plates 79 are each provided at either of their ends with projecting ears 79a, Figures 4 and 13, the lower edges of which rest upon the upper flanges of the intermediate transverse beams 76 and 77.

Likewise. the bottom surfaces of the castings 84 rest upon these beams 76 and 77 and are secured thereto by the bolts 90 and 91, as described.

Attached to this structure are a pair of leg members at either side of the assembly of parallel sheave members.

As illustrated in Figure 5, these legs, which may be designated 92 and 93, are supported at their lower ends upon the angle irons 78 and are secured thereto by means of angles 94 and 95.

Secured to angle irons 78, preferably by welding, at about their longitudinal center, are plates 78a, (Figure 5), which extend inwardly to be secured to the outer members of the set of beam plates 79, below the shaft 117, by means of the bolts 78b and the nuts 78c, which bolts are passed through the apertures 78d in the plate 78a and the apertures in the bracket members 79b which project outwardly from the outer beam plates 79, as shown in Figure 3.

This construction effectively ties the angles 78 to the mass of the parallel-sheave assembly in a manner to insure that the load received from the legs 92 and 93 does not operate to distort these angles 78 outwardly.

These legs 92 and 93 are braced intermediate their length by a cross piece 96.

At their upper ends, they are tied together by means of channel members 97 which are disposed with their flanges inwardly turned and which are secured, preferably by welding, to the inner surfaces of the angles which form these legs.

In addition, the upper ends of these legs are capped by plates 98 and 99 secured thereto which are apertured to permit the passage of bolts through them. Likewise, the upper flanges of the channel members 97 have, superimposed thereon and secured thereto plates 100, which are likewise apertured for the passage of bolts through them.

Adjacent the upper ends of these legs, 92 and 93, are provided inwardly extending wing plates 101, which are riveted to the legs, and which are adapted to project into the space between the flanges 82 and 83 of the channel members 81.

Adjacent their inner ends these inwardly projecting wing plates 101 are provided with bolts 102 for connecting them with angle members 103 secured to the channel members 81 as at 104. The bolts 102 pass through vertical slots 105 in the outstanding legs of the angles 103.

The beam plate assembly which contains and supports the parallel compound pulley sheave members is provided with a plurality of rope guards.

One pair of these rope guards comprise units 106 disposed parallel with the inner sides of the webs of the intermediate transverse beams 76 and 77 and substantially parallel to the axes of the parallel sheaves and substantially in the same horizontal plane therewith, as best seen in Figures 3 and 8.

The ends of each of these units 106 are provided with flanges 107 so that they may be secured to the outer beam plates of the group of beam plates 79, the bolts used to so secure these rope guards being designed to extend through apertures 108 in bracket members 109, which are riveted to the outer beam plates, as at 110, and which are adapted to be bolted to the webs of the intermediate transverse beams 76 and 77, by means of bolts passing through the apertures 111 of these brackets, these bolts being indicated at 112 in Figure 3.

The other pair of rope guards 113, Figures 3 and 8, serve not only as rope guards, but they also serve as beam stiffeners for the beam plates 79 between which the parallel sheave members are supported.

Two of these rope guards, which at the same time function as beam stiffeners, are preferably provided and, as shown in Figures 3 and 8, they are mounted upon the tops of the beam plates 79, one on either side of the axes of the parallel compound pulley sheave members. Each of these stiffeners 113 is bolted at its end extremities to the upper flanges 83 of the channel members 81.

Each of these rope guards 113, which also function as beam stiffeners, is preferably made of cast steel and so formed that its under surface is provided with alternate rope grooves and slots or sockets.

The rope grooves thereof are designated 114 and are so located that each rope groove bears a superposed relation to the rope groove of a sheave member when the guard is functioning as a beam stiffener for the beam plates 79.

The slots 115 which are formed in the lower surfaces of the guards are milled to embrace and closely fit the tops of the intermediate beam plates between which sheave members are supported.

The outer plates of the group 79 abut against milled shoulders 115a on the guard member.

If desired, tapered bolts may be utilized for securing these rope guards to the upper flanges 83 of the channel members 81 to secure an accurate spacing for the outer beam plates, with respect to the intermediate plates adjacent to them, and to bind all of the plates 79 together to form an unusually stiff and rigid set of beam plates.

The parallel compound pulley sheave members are designated 116 and each of these sheave members is located between a pair of the beam plates 79.

These sheave members are of comparatively large diameter in that they extend almost across the space between the edges of the water table beams of the derrick.

They are all preferably mounted upon coincident axes, in this instance, by means of a shaft 117 which passes through them and is secured in position in the plates 79 by means of nuts 118 upon the ends thereof.

Each sheave member 116 is supported from the shaft 117 by a roller bearing sleeve 119, as shown in Figure 12.

Each roller bearing sleeve 119 is of slightly greater length than the hub of the sheave which it supports so that the tightening of the nuts 118 on the ends of the shaft 117 may be effected without causing any pair of beam plates to be brought into binding relation with the sheave between them.

Thus these sleeves 119 serve also as spacing and stiffening units between the plates 79.

An important element in combination with the plurality of sheave members 116 is the obliquely transverse sheave 144 which is, in the preferred form of this invention, supported above the structure just described.

The base supporting member for this obliquely transverse sheave is designated 121 and takes the form of a rectangular plate with a circular opening of substantial size formed therein and provided with adequate reinforcing webs 122 throughout.

This rectangular plate is mounted upon and secured to the plates 98, 99 and 100 on the leg structure 92 and 93, by means of bolts 123 and the nuts 124.

Both the plate 121, the legs 92 and 93, and the structure associated therewith, are further braced against swaying by the blocks 120 bolted to the upper flanges 83 of the channel members 81 and abutting the sides of the plate 121.

Seated in the circular opening in the rectangular plate 121, is a cone structure 125 which is provided with diametrically opposite slots 125a in which the obliquely transverse sheave is adapted to rotate.

This conical supporting member is provided with a flange 126 on its base which is also provided with a downwardly extending annular shoulder 127 for projecting downwardly into the circular opening in the plate 121. In concentric relation to this shoulder, the base flange of the conical member rests on a circular seat 128.

This conical member is normally held in fixed position upon its seat by means of bolts 129 which pass through the rectangular plate 121 from beneath and which are threaded at their upper ends for the reception of nuts 130.

However, under certain conditions, it becomees desirable to adjust the angular relation of the oblique sheave to the set of parallel sheaves 116.

In order to facilitate this adjustment, I have provided roller means upon the conical member which may be rendered operative at the desired time.

This roller means preferably comprises a plurality of levers 131 which are fulcrumed in upstanding spaced lugs 132, as at 133, formed on the base of the conical member, as best seen in Figure 14.

Each of these levers 131 is provided with a bifurcated end 134 in which is mounted a roller 135. This roller 135 is normally disposed with its lower side within an opening 136 through the flange 126 of the conical supporting member.

The other end of each lever 131 is provided with an enlargement 137 having a threaded aperture therethrough for the reception of a screw bolt 138 the lower end 139 of which bears upon the upper surface of the flange 126, said lower end 139 being rounded to facilitate such movement thereof as may be necessary during the adjustment of this bolt, thereby preventing the formation of a grooved seat which would interfere with its proper functioning.

In operation of this structure to bring about an adjustment of the conical member 125, the bolts 129 are removed and the bolts 138 are manipulated so as to cause the rollers 135 to pass downwardly through the openings 136 and to elevate the conical member so that it will be supported upon its seat by these rollers 135.

When this position is attained, the conical member may be rotated to any desired position of adjustment, lowered by reverse manipulation of the bolts 138, and the bolts 129 again utilized to fix this conical member in its adjusted position, suitable bolt holes being present in the structure to facilitate this operation.

The upper end of the conical member 125 is provided with flanges 140 to which are adapted to be bolted a plurality of semi-circular plates 141 having upstanding members 142 which form bearings to support a shaft or trunnions 143 upon which rotates the obliquely transverse sheave 144.

The intermediate transverse beams 76 and 77, together with all of the parts which they support, and the legs 92 and 93 which support the oblique sheave member of the compound pulley standing block unit, are adjustable as a unit along the base beams 70 and 71 by means of adjusting bolts 145 which are secured to the webs of these intermediate transverse beams 76 and 77 at the four corners of the assembly.

The bolts 145 extend through apertures in fixed bracket members 146, and adjustment of the assembly is effected by means of nuts 147 which engage the sides of the vertical limbs of the brackets 146. These bracket members are preferably bolted, as at 148, to the upper flanges of the base beams 70 and 71.

A means for securing these parts for operation is provided in the form of bolts 149 extending upwardly through the outer, upper flanges of the base beams 70 and 71, which bolts project through slots 150 in the horizontal legs of the angle members 78.

The angle members 94 and 95, to which the legs 92 and 93 are bolted, are further provided with extensions 152 which are apertured for the reception of hook bolts 153 which are designed to hook under the inner, upper flanges of the base beams 70 and 71, and pass upwardly through said aperture in extensions 152 and be secured by nuts on their upper ends.

The means for supporting standard cable-drilling rig sheaves which I preferably utilize will vary in accordance with whether or not they are being used in "Mid-Continent practice" or in California combination rig practice.

Likewise, in the "Mid-Continent practice", the means will slightly vary, dependent upon whether or not the vertical spacing means is utilized with the novel compound pulley standing block unit of my invention.

The structure which I preferably use to support the standard cable-drilling rig sheaves for "Mid-Continent practice" is shown best in Figures 3, 4, 7, 8, 15 and 16.

In this form shown in Figures 3, 4, 7, and 8, it will be noted that the standard cable-drilling rig sheaves are supported by a suspended basket structure.

Furthermore, in Figures 7 and 8, it will be seen that this basket structure hangs entirely within the opposing sets of plies which lead from the sheave members of the crown block to the sheave members of the traveling block.

The basket structure preferably comprises four pairs of strap members 154, the upper ends of each pair being riveted, as at 155, to opposing sides of one of the plates 79, preferably adjacent the ends of such plates.

At their lower ends, these pairs of straps are adapted to receive complemental straps 160 attached to beams upon which sheave bearing means are supported.

Where the vertical spacing structure embodying the struts 57 is not utilized with the compound pulley standing block unit, four substitute strap members 156 are used intermediate the upper straps 154 and the lower straps 160, as best seen in Figure 4, to insure that the standard cable-drilling rig sheaves will be spaced a sufficient distance below the parallel compound pulley sheave members to avoid interference of the "sand line" of the standard cable-drilling rig with the water table beams of the derrick, particularly the bottom of such beams.

These four substitute extension straps 156 are designed to have their upper ends pass into the space between lower ends of the units of the pairs of strap members 154 and to be bolted thereto as at 157.

Intermediate their lengths these straps are braced by cross pieces 158 which may be bolted thereto.

The lower ends of these substitute extension straps 156 are bifurcated, as at 159, for the reception of supporting straps 160 which interfit the ends of such bifurcations and are bolted thereto as at 161.

These lower, upwardly extending, strap members 160 are inwardly bent adjacent their lower ends and permanently secured to spaced beams 162 formed of rolled stock which are designed to receive and support bearing means for supporting the means upon which the standard cable-drilling rig sheave members rotate.

As illustrated best in Figure 15, these bearing members 163 are adjustable along the beams 162 and may be securely and rigidly fixed at any desired position therealong so that the standard cable-drilling rig sheaves may be given any selected position with relation to the well being drilled.

In order to produce a structure which, although adjustable, will be amply rigid when once placed in assembled position, the bearings 163 are provided with grooves 164 which straddle and closely fit the upper edges of the beams 162.

These bearing members 163 are each provided with an elongated leg member 165 which extends downwardly between the inner surfaces of the beams 162, and which are provided upon their lower ends with threaded bolt holes 166.

Complemental to these bearings and particularly to the legs 165 thereof is a bottom truss bar 167 which is provided with grooves 168 for the reception of the lower edges of the beams 162, and which is also provided with bolt holes through which project cap screws 169. These cap screws 169 project upwardly and are threaded into the threaded bolt holes 166.

The structure is such that tightening of the cap screws 169 will result in drawing the bottom truss bar 167 upwardly so as to clamp the beams 162 between the bearings 163 and this bottom truss bar 167, this being effected, after adjustment, to insure that the bearings 163 will remain in a fixed position upon the beams 162, and that a rigid structure will result.

The rigidity of this structure is further enhanced by the fact that the bearing members are of one piece construction, and that the shafts 163a for the sheave members project through beyond the outer upper sides of the bearing members 163 and that the shafts 163a are cut away as at 170 to form a seat for the reception of rectangular bars 171, which are designed to be secured in the said seat 170 on the bearing members 163 by means of bolts 172.

Thus, the sheave members 173 are maintained in the proper rotatable position while, at the same time, the shafts and the clamping structures just described produce, in effect, an upper truss bar construction.

The result is that, when once a sheave member has been adjusted to the desired position and clamped therein by the mechanism just described, there is formed a rigid construction which is trussed both above and below.

Beams 162 are further provided with formations 174 which extend for a substantial distance along their outer surfaces to form lips or flanges which are preferably integrally formed therewith.

These lips or flanges 174 project into elongated sockets 175 in the truss bar 167 which is slid onto them from an end, and serve to prevent the bottom truss bar from dropping away from its associated parts during the introduction of the cap screws 169, thus contributing to safety in a drilling rig.

When the standard cable-drilling rig sheave supporting mechanism is to be used in an assembly in which the beams 70 and 71 are spaced above the water table beams, as by the use of the struts 57, and their supporting beams 25—26 and 27—28, the structure shown in Figure 4 is utilized without the substitute straps 156.

The apparatus is used in this manner in the structure shown in Figure 3.

When assembling the mechanism as shown in Figure 3, these substitute straps 156 are dispensed with and the members 160 are connected directly to the units of the pairs of straps 154, being secured thereto by the bolts 157.

To further strengthen this structure, the horizontal bracing bars 158 are applied across between the pairs of straps 154, being secured by bolts as at 157.

The basket structure which carries the standard cable-drilling rig sheaves is preferably braced against swaying action by means of links 176 which are provided at their inner ends with eyes that interfit with eye-bolts 177, carried by the beams 162 adjacent the ends thereof.

The outer ends of the links 176 may be connected to the derrick legs when the structure is used with the extension substitute straps 156.

When this structure is used without the straps 156, as in Figure 3, the outer ends of these links 176 are connected to the brackets 178 which are secured to the transverse base beams 26 and 27, and which project obliquely therefrom.

The method of reeving the line through the various sheaves of the compound pulley will be described more in detail later.

It will be noted, however, that the two running parts of the line which extend downwardly from diametrically opposed points on the periphery of the oblique sheave 144 are, under certain conditions, in comparatively close proximity to the inner flanges of the base beams 27 and 28, and, that if the vertical spacing apparatus be not utilized, these plies would bear substantially the same relation to beams 70 and 71.

These conditions arise when the traveling block is in the lower portion of its path of movement, particularly when it is attached to a load eccentric to the well, or otherwise diverted sidewise from its normal position of vertical concentricity with the well.

Under these conditions it is desirable to provide a means for preventing the harmful effect of frictional contact between these beams and the line.

The means which I preferably utilize comprises a roller 179 which is carried by a bracket 180 clamped to the lower flange of each of the cross beams 26 and 27.

This bracket 180 preferably comprises a clamping element 181 which is held upon the main portion of the bracket by bolts 182. The inner end of the main portion of the bracket is provided with upwardly turned legs 183 carrying journals for the support of the roller 179 therebetween. The upper extremities of these legs are joined by a cross bar 185.

These rollers may also be adapted to be mounted and function on the beams 70 and 71 of the compound pulley standing block unit when this latter is utilized without a vertical spacing means.

The structure just described is such that these rollers may be individually moved to any desired position along either set of the beams upon which they are mounted.

Thus, they may be adjusted to bring them into proper position upon their supporting beams to protect the plies or parts of rope extending downwardly from the oblique sheave 144, regardless of the assembly utilized.

When my compound pulley structure is applied to derricks operating under the so-called California combination rig practice, wherein the calf wheel and rotary draw works are located upon adjacent sides of the derrick base, the structure used is substantially the same as that thus far described.

However, there are certain important exceptions.

One exception arises from the fact that the novel compound pulley standing block and its supporting structure per se, embodying the beams 70 and 71 as its base beams, and everything carried thereby is assembled in a position at an angle of 90 degrees from the position shown in Figures 1, 3, 6, 7, 8 and 17.

In this position, these base beams are in parallelism with the water table beams 23 and 24, instead of being at right angles thereto as they are in "Mid-Continent practice".

They are shown assembled in this position in Figures 2, 18, 19 and 20. Likewise, the traveling block is suspended in a position at right angles to the position in which it hangs in "Mid-Continent" practice.

By comparing Figure 20 of the drawings, which is a view in side elevation of the assembly for California combination rig practice, with Figure 7, which is a view in side elevation of the assembly for Mid-Continent practice, it will be seen that in the different assemblies the struts 57 and the base beams 25—26 and 27—28, are differently disposed with respect to the longitudinal centers of the beams upon which they are respectively supported.

In the assembly shown in Figure 7, the struts 57 are disposed so that their bottom flanges overlap the vertical planes of the water table beams 23 and 24 of the derrick, which results in each strut of the pairs of them being a relatively greater distance from the longitudinal center of the pair of base beams which support them, and from each other, with a consequently greater over-all width of their upper flanges, taken together, along the length of the base beams.

In Figure 8, it will be noted that the relation of the pairs of base beams 25—26, and 27—28 to the longitudinal centers of the water table beams which support them is, in the assembly for "Mid-Continent" practice governed by the width of the base of the compound pulley standing block structural unit, or, in other words, the distance from vertical center to vertical center of the beams 70 and 71.

In the assembly shown in Figure 20, the width of the base of the compound pulley standing block structural unit governs, not the relation of the pairs of beams 25—26 and 27—28 with respect to the longitudinal centers of the water table beams 23 and 24 of the derrick; but, the relation of the individual struts with respect to the longitudinal centers of the base beams 25—26 and 27—28 which support the pairs of them.

Consequently, in this assembly, the struts 57 are relatively closer to the longitudinal centers of the beams 25—26 and 27—28; relatively closer to each other taken along the length of said beams; have a relatively less over-all width of their upper flanges taken together therealong; and, their lower flanges do not overlap the vertical planes of the water table beams of the derrick, but lie wholly between the vertical planes coincident with the latter.

In practice, for a California combination rig assembly, the base beams 25—26 and 27—28 of the vertical spacing apparatus are preferably disposed closely adjacent to the corners of the derrick top, and when so disposed the outer lines thereof and the outer lines of the water table beams 23 and 24 of the derrick form the sides of a substantially equi-lateral rectangle, as in Figure 19.

In practice, for a "Mid-Continent" assembly, these base beams 25—26 and 27—28 of the vertical spacing apparatus are appreciably closer to the longitudinal centers of the water table beams 23 and 24 of the derrick than in the California combination rig assembly, as will be noted by reference to Figure 6, wherein the outer lines of these base beams 25—26 and 27—28 form the long sides of an oblong, and wherein the outer lines of the water table beams of the derrick form the short sides or ends of the said oblong.

In order to provide for these different assemblies, as well as to produce a structure of less weight than would otherwise be necessary, the structure and securing means which I provide in and for these struts 57 is such that they are adapted to each be assembled in relatively different positions with respect to the longitudinal centers of the base beams 25—26 and 27—28 which support them, whereby the distance between the units of the pairs of them, taken along the length of the said base beams, may be varied to conform to the corners of the oblong base of the compound pulley standing block unit which they support, whether the said oblong base be assembled with its long sides parallel to the base beams 25—26 and 27—28 or crosswise to them.

Likewise, the structure and attaching means which I provide in and for the pairs of base beams 25—26 and 27—28 are such that each pair of them is adapted to be assembled in relatively different positions with respect to the longitudinal centers of the water table beams which support them, whereby they may be positioned so that the width of them taken together as a base structure may be varied to conform substantially to either the length of or the width of the oblong base of the standing block unit, the means provided being, in this instance, the pivoted slidable arms 31, the hook bolts 52 and the set screws 56.

In providing for the California combination rig assembly I have found it desirable to supplement my compound pulley standing block sheave assembly by means of a fair leader idler pulley 186 which may be mounted on a pair of the transverse base beams 25—26, or 27—28, of the vertical spacing apparatus.

This idler pulley for fair leading 186 is, as is shown in the drawings, rotatably mounted upon a bearing block 187 which is adjustably secured to a pair of the transverse base beams, in this case, 25—26, and adjustable along the length thereof so that it may be set properly to fair lead from any one of the parallel sheaves 116 to conform to any one of several reevings that may be utilized in reeving the apparatus.

This idler pulley fair leader 186 may thereby be positioned so that the line may be fairly led to the calf wheel with any of the several reevings.

In this California combination rig practice, the standard cable-drilling rig sheaves are preferably supported by bearings 188 (see Figure 18) which are carried by spaced beams 189.

It is important to note, that, with my structure in either of the described assemblies the standard cable-drilling rig sheaves and their supporting bearings and beams constitute an independent unit which may at will be introduced into or removed from the space above the level of the water table beams of the derrick and below the compound pulley standing block sheaves without affecting any of the compound pulley sheaves or their supporting structure or the idler pulley or its supporting structure just described.

Thus, the standard cable-drilling rig sheaves may be made available for use without necessitating the unreeving of the compound pulley hoisting line, either from the compound pulley sheaves or from the idler pulley, and without the necessity for removing or displacing any of the compound pulley sheaves or the idler pulley.

Likewise, the hoisting rope may always remain properly rove through the compound pulley sheaves and alongside the idler pulley and operative without the necessity for installing or utilizing any part of the standard cable-drilling rig sheaves or the supporting means therefor. It will be appreciated that in maintaining the standard cable-drilling rig sheaves at the usual, conventional level, by means of my novel beam and bearing structure, in suspended form, as shown in Figures 3, 7 and 8, and by means of the usual, conventional installation between a pair of beams disposed directly on the water table beams of the derrick, as shown in Figures 18 and 20, I have conserved the advantage of being able to utilize, with a proper working clearance and without any special guiding means, the largest possible diameter drilling line sheave consistent with the clearance between the sides of the opening through the conventional water table of a derrick, in contradistinction to certain novel crown block constructions, and certain novel derrick constructions, in which the disposition of the standard cable-drilling rig sheaves above the compound pulley standing block sheaves inevitably requires either a relatively reduced diameter in the drilling line sheave, or special guiding means, or both, to attain a proper clearance for leading the drilling line up from the bull wheels, through the water table and onto the drilling line sheave.

It will be obvious, furthermore, that by employing the suspension means which I have conceived for supporting the standard cable-drilling rig sheaves, (best shown in Figure 4) and particularly the drilling line sheave, I may at will, in either California combination rig practice, or in "mid-continent rig" practice, attain the much desired end of increasing the diameter of the drilling line sheave while maintaining a proper working clearance for the standard cable-drilling line; and without any special guiding means for it.

By reference to Figure 21, wherein a sufficient number of compound pulley sheave members are shown to permit the reeving of from a minimum of four to a maximum of ten running parts of the hoisting line thereto for the practice in the mid-continent field, if desired, it will be noted that the compound pulley sheaves both of the crown block and the traveling block are indicated by roman numerals which are arranged in the order of succession in which the natural reeving of the line through them follows, and that the successive running parts of the line, in the natural order in which they are to be rove through the compound pulley sheaves, are indicated by arabic numerals.

The end of the rope which is initially fixed, and which is not utilized in effecting changes, additions or reductions of the number of running parts rove in excess of four, is indicated by the numeral 0, while the end of the line which must be freed and utilized to effect changes, additions or reductions in the number of parts rove, in excess of the minimum operative reeving of four running parts, is indicated by the numeral 00.

In other words, with reference to this Figure 21, it will be seen that the end 0 of the line is secured initially to the calf wheel or other anchorage means, which latter may be either on the derrick floor or on the traveling block.

With this condition existing, the end of the line 00 has been passed upwardly over the compound pulley sheave member I, which in this instance, is one of the outer sheave members of the plurality of parallel compound pulley sheaves in the crown block.

Leaving this sheave member I, it extends downwardly to become ply 1 which passes to the traveling block, through the groove of and under sheave member II, which is one of the outer sheave members of the traveling block.

Leaving this sheave member II of the traveling block, the line extends upwardly to become ply 2, and to pass through the groove of and over the oblique sheave III, which is the sheave 144 of the structure shown in Figures 3 and 17.

Leaving this oblique sheave III the line extends downwardly to become ply 3, which passes through the groove of and under the other outer sheave member IV of the traveling block, and thence extends upwardly to form ply 4, which passes, in this instance, through the groove of and over the other outer sheave member V of the parallel compound pulley sheave members of the crown block, and thence downwardly to the rotary draw works.

At this point it will be seen that the traveling block is supported from the crown block by four running parts which serve to suspend it by two cradle loops, one of which loops is produced by the running parts 1 and 2, which loop engages and supports the outer sheave member of the traveling block which is designated II, and the other of which loops is produced by the running parts 3 and 4, which second loop engages and supports the other outer sheave member of the traveling block, which is designated IV.

Thus, when these four running parts of the compound pulley hoisting line have been rove, the traveling block is suspended in a balanced condition and centered position.

It will of course be understood that this traveling block is now ready for use under actual operating conditions with the said four running parts rove thereto, and the said ends of the hoisting line led off from over compound pulley sheaves in the crown block, as has just been described.

When the conditions of the well-drilling operation require the reeving of additional running parts to the compound pulley sheaves, the initial reeving of the four plies in the manner just described insures that subsequently rove plies will be rove to the intermediate sheave members of the traveling block.

The additional reeving which I preferably utilize with a traveling block having five sheaves, in combination with five parallel sheaves and complementary oblique sheave means in my standing block unit to insure that the centered position and balanced condition of the traveling block will be maintained whether six, eight or ten running parts be rove and operated will now be described.

By reference to Figure 22, it will be seen that, in changing from the four part reeving of Figure 21 to the six part reeving of Figure 22, the end 00 of the line has been released from the rotary draw works to form ply number 5, which latter passes through the groove of and under sheave member VI of the traveling block, and thence upwardly to form ply number 6, which latter passes through the groove of and over crown block sheave VII, and thence has been passed downwardly and connected to the rotary draw works.

By reference to Figure 23, it will be seen that, in changing from the six part reeving of Figure 22 to the eight part reeving of Figure 23, the end 00 of the line has been released from the rotary draw works to form ply number 7, which latter passes through the groove of and under traveling block sheave VIII, and thence upwardly to form ply number 8, which latter passes through the groove of and over crown block sheave IX, and then has been passed downwardly and connected to the rotary draw works.

By reference to Figure 24, it will be seen that, in changing from the eight part reeving of Figure 23 to the ten part reeving of Figure 24, the end 00 of the line has been released from the rotary draw works to form ply number 9 which latter passes through the groove of and under traveling block sheave X, and then passes upwardly to form ply number 10, which latter passes through the groove of and over crown block sheave XI, and then has been passed downwardly and connected to the rotary draw works.

Under certain conditions, it is desirable in the field to use what is known as the left hand rig.

In this left hand rig, the calf wheel remains on the walking beam side of the derrick base but is in a different corner thereof, the positions occupied by the calf wheel corner and the crane post corner in a right hand rig being exchanged each for the other.

Figure 25 is substantially identical in showing with Figure 21, except that the oblique sheave has been adjusted to lead to the other diagonally opposite corners of the derrick and that it shows a four part reeving for a left hand rig.

It is not believed necessary to trace the plies of the line since the compound pulley sheaves have been numbered in their proper sequence, but it will be apparent that the traveling block is supported by two cradle loops, the component line parts of which extend from the outer sheave members thereof, while the end 0 of the line merely leads from a different corner of the derrick.

The end 00 leads to the same position, but, in a four part reeving, from a different outer sheave of the parallel compound pulley sheave assembly in the crown block, as compared with the four part reeving for the usual right hand rig, as shown in Figure 21.

In Figures 26, 27 and 28, I have shown different operative reevings for California combination rig practice.

Figure 26 shows my preferred reeving for a five sheave traveling block and, in this reeving the idler remains fixed.

In Figure 27 I have shown a six part reeving, utilizing the adjustable feature of the idler pulley.

In Figure 28, I have shown a reeving substantially identical with that shown in Figure 26 except that the reeving commences on an opposite side of the center of the parallel compound pulley sheave assembly.

The reeving shown in Figure 26 is much to be preferred in California combination rig practice, because the "derrick-man" in that practice is immediately adjacent to the position of the line part I in this reeving, and since this part I is the "dead line" and does not move when the draw works drum, which is the winding element usually employed, is in operation, the "derrick-man" may safely use this line to swing the traveling block to facilitate his work; and, likewise, may grasp this line part in safety should he lose his balance.

Thus it will be seen that, in Figure 26, the end 0 of the line is connected to the calf wheel. Then, the end 00 is led upwardly through the groove of and by the side of the fair leader idler pulley, and thence through the groove of and over the outer sheave member I of the crown block, which latter, in the present instance, is the farthest parallel compound pulley sheave member from the calf wheel. Leaving this sheave member I, the line extends downwardly to form ply number 1, which latter passes through the groove of and under the outer sheave member II of the traveling block, and then extends upwardly as ply number 2, and to then pass through the groove of and over oblique sheave member III.

From the oblique sheave III, it extends downwardly as ply number 3, and passes through the groove of and under the other outer sheave member IV of the traveling block.

Leaving this sheave member IV, it extends upwardly as ply number 4, and passes through the groove of and over the other outer compound pulley sheave member V of the crown block, and then is led downwardly and connected to the draw works.

The unrove sheaves in Figure 26 are numbered in the sequence in which additional running parts are to be rove.

In the reeving shown in Figure 27, the end of the line 0 was connected to the draw works and the end of the line 00 was then led upwardly to and through the groove of and over the outer sheave member I of the crown block, which latter, in this instance, is the nearest of the parallel compound pulley sheaves to the calf wheel.

From this sheave member I of the crown block, it extends downwardly as ply number 1, through the groove of and under the outer sheave member II of the traveling block, and then extends upwardly as ply number 2 through the groove of and over the oblique sheave member III of the crown block.

Leaving this oblique sheave member III it extends downwardly as ply number 3, through the groove of and under the other outer sheave member IV of the traveling block, whence it extends upwardly as ply number 4, through the groove of and over, in this instance, the other outer sheave member V, of the parallel compound pulley sheave members of the crown block.

From this sheave member V, it extends downwardly as ply number 5, through the groove of and under intermediate sheave member VI of the traveling block, then extending upwardly as ply number 6, through the groove of and over intermediate sheave member VII of the crown block, and then downwardly through the groove of and alongside of the fair leader idler pulley A, being then connected to the calf wheel.

If it had been desired to reeve only four running parts with the structure shown in Figure 27, the idler A would have been adjusted to the left of this figure so as to receive the end 00 of the line and fair lead it downwardly from the sheave member V.

In other words, this idler A would have been adjusted to the same relation to sheave member V that it now bears to sheave member VII.

The further sequence of this reeving shown is indicated by the roman numerals on the parallel sheaves.

Referring to Figure 28, the end 0 of the line is shown connected to the calf wheel.

The end 00 was then led upwardly through the groove of and alongside of the idler pulley A, and thence upwardly through the groove of and over the parallel compound pulley sheave closest to the calf wheel, which, in this instance, is designated as sheave member I of the crown block.

From this sheave member I, it was led downwardly as ply number 1, through the groove of and under the outer sheave member II of the traveling block, and then upwardly as ply number 2, thence through the groove of and over oblique sheave member III of the crown block, then downwardly as ply number 3, through the groove of and under the other outer sheave member IV of the traveling block, then upwardly as ply number 4 through the groove of and over, in this instance, the other outer sheave member V of the parallel compound pulley sheaves of the crown block, and thence down to the draw works.

The assembly of my crown block structure is readily effected.

The upper portion of the parallel sheave structural unit of the compound pulley standing block in my novel crown block is preferably provided with a plurality of rope guiding grooves 190 which are so located that they will effectively cooperate with the lug 75 disposed centrally of the bitt means 73a on the spreader member 73 for centering the parts of a snubbing rope which is secured thereon at either side of this lug, thereby centering the bight or vertex of the snubbing rope.

In practice, when using my vertical spacing apparatus the order of assembly is preferably as follows:

The struts 57 are hoisted to the top of the derrick and set aside on the safety platform surrounding the water table of the derrick (not shown).

The transverse base beams 25—26 and 27—28 with the arms 31 bolted to them, and the hook bolts 52 inserted therethrough, with the nuts 53 threaded loosely thereon, the U-shaped members 46, the pairs of barrel or knuckle members 41, and the hinge bolts 43a are then hoisted to the top of the derrick.

The U-shaped members are secured to the water table beams 23 and 24 of the derrick by means of the swiveled bolts 50 and the plates 51, after which the hinge bolts 43a are inserted through the barrel members 41—41 and 43 to assemble the hinges, and the nuts 39 are threaded loosely on to the upstanding bolts 38.

With this preliminary assembly accomplished, the next step is to locate the pairs of transverse base beams 25—26 and 27—28 with respect to the horizontal centers of the water table beams 23 and 24 of the derrick, having regard to the assembly which it is proposed to effect.

As hereinabove explained, these transverse base beams will be closely adjacent the corners of the derrick top when assembled for California combination rig practice and relatively closer to the horizontal centers of the water table beams for "mid-continent" practice.

Having determined the location of these base beams, their positions are fixed by the bolts 56 so that in later steps in the course of the operation of assembling the block, no time will be lost in bringing these beams to their requisite positions.

In practice, it will perhaps be desirable to have different sets of the bolts 56 for the different assemblies, i. e., a relatively short set to effect the "Mid-Continent" assembly and a relatively long set to effect the California combination rig assembly.

The location of the transverse beams 25—26 and 27—28 having been effected, the respective pairs of them are slid outwardly to the ends of the water table beams 23 and 24 of the derrick, and then swung in an arc, upwardly and outwardly, to the position shown in Figure 11 of the drawings.

The compound pulley standing block structural unit of which the beams 70 and 71 form the base, stripped of the rectangular plate 121, the supporting cone 125 for the oblique sheave member, and the oblique sheave 144, is next prepared for hoisting.

Sling means (not shown), disposed symmetrically of the transverse center of the assembly of parallel compound pulley sheaves, is secured in the peripheral grooves of and around one or more of the sheaves 116, and the hoisting line is rove to pulley means supported by a gin pole at the top of the derrick (not shown) is secured to the sling means.

A snubbing rope (not shown) is secured about the hoisting line or sling means and shortened until the latter is drawn into and seated in one or more of the rope guiding grooves 190, and the snubbing rope is then bitted on the portions 73a on one of the beam spreaders 73 at an end of the base beams 70 and 71 of the standing block unit.

When the snubbing rope has been applied as above described its relation to the hoisting line and to the assembly to be hoisted is such that when the hoisting line has taken the weight of the assembly the latter will be suspended in a position substantially ninety degrees from its normal disposition, i. e., the base beams 70 and 71 will be disposed substantially perpendicularly.

With these beams 70 and 71 thus disposed perpendicularly the assembly is then hoisted to the top of the derrick and passes readily and conveniently through the space between the inner edges of the water table beams of the derrick.

After the described assembly has been raised to a point where the lower ends of the beams 70 and 71 in the suspended perpendicular position will clear the top of the derrick, the snubbing rope is paid out from the portions 73a of the beam spreader 73 until the beams 70 and 71 reassume their normal horizontality, after which the snubbing rope is unbitted and removed.

The pairs of pivoted base beams 25—26 and 27—28 of the vertical spacing apparatus are then swung in an arc, inwardly and downwardly, until they repose on the water table beams of the derrick, and they are then slid toward the horizontal centers of the latter until stopped by the previously adjusted bolts 56.

The arms 31 are then secured to hold these pairs of base beams in operative position, by means of the hook bolts 52 and the nuts 53, as well as by the bolts 38 and the nuts 39.

The struts 57 are next placed on the pairs of beams 25—26 and 27—28 and loosely secured thereto by the bolts 59 and the nuts 62.

These struts at this time are maneuvered to approximately the position conforming to their place in the assembly desired.

The described assembly carried by the beams 70 and 71, which, during the process of placing the base beams and struts in operative position, has been held suspended from the gin pole of the derrick, is next lowered until the bolts 72 can be applied to connect the lower flanges of the beams 70 and 71 to the top flanges of the struts, which application is facilitated by the relative looseness of the struts on the base beams 25—26 and 27—28.

The nuts 72a are then applied and tightened and the hoisting line is relaxed, after which the nuts 62 are tightened to complete the assembly of the vertical spacing apparatus and the beams 70 and 71.

With respect to the assembling of the rectangular plate 121, the cone 125 and the oblique sheave 144, this will be largely a matter of choice and convenience with the user.

These parts may be hoisted and set aside on the safety platform of the derrick before the unit carried by the beams 70 and 71 is hoisted, to be assembled therefrom after the latter has been mounted, or, if desired, these parts may be hoisted up outside of the derrick after the unit carried by the beams 70 and 71 is in place.

It is not believed requisite to describe the assembly of these parts in detail, as the manner of their assembly is amply indicated with the description of them hereinabove.

It will, of course, be understood that when the compound pulley standing block unit is utilized without the vertical spacing apparatus, the method of hoisting the former will be identical with the above described method, and that the beams 70 and 71 will be disposed directly on the water table beams of the derrick.

With respect to the standard cable-drilling rig, simple pulley, sheave means and the supporting structure therefor, these of course may, in either form thereof, be assembled at will, at any time desired after the assembly of the compound pulley standing block unit has been accomplished.

It will be seen from this description that I have provided a combination crown block structure, which lends itself readily to the meeting of conditions either with the ends of the compound pulley hoisting line leading to opposite sides of a derrick base or with the said ends leading to adjacent sides of such derrick base.

In the first case, with all of the parallel compound pulley sheaves of this invention disposed with their axes in parallelism with the axes of the hoisting drums on opposite sides of a derrick base, the ends of the said line when rove according to my invention lead naturally and fairly to their respective drums.

When my invention and method of reeving is to be applied to a derrick wherein the hoisting drums are on adjacent sides of the derrick base, this may be readily effected during assemblage by positioning the standing block unit of my crown block upon the derrick so that the axes of all of the parallel compound pulley sheaves are in parallelism with the axis of one of the hoisting drums, and at a substantial angle to the axis of the other drum.

This insures that one end of the hoisting line will fair lead naturally off from over one of the parallel compound pulley sheaves of the crown block to one of the hoisting drums, while the other end thereof may be fair led off from over another of the parallel compound pulley sheaves of the crown block to the other hoisting drum by means of my idler fair leader pulley which is supplemental to the essential invention whereby the traveling block is balanced and centered under all conditions of reeving and operation, but independent of the standard cable-drilling rig sheaves and their supporting means.

Thus, in the operation of my invention excessive side diversion is substantially eliminated, both in the running lines and in the parts of the line extending from the crown block to form the standing parts and fall parts of the apparatus, these latter terms being applicable interchangeably to both of the ends extending from the crown block, dependent upon which one the pulling force is applied to, and, in the spirit of the invention, both could be fall parts, as it is entirely feasible to pull on both ends simultaneously.

Furthermore, it will be apparent that my structure of crown block and my method of reeving the compound pulley sheave members thereof provides means to secure a balanced and centered traveling block under all conditions of operation.

The traveling block is balanced and centered when it is supported by four running parts rove in direct sequence from an end to the outer sheaves thereof and, since the reeving of any other plies additionally of four plies so rove is always to intermediate sheaves of the traveling block, this balanced and centered condition is never disturbed.

Thus, the balanced condition and centered position will persist, in the practice of my invention, and my method of reeving, irrespective of the number of parts rove in excess of four.

It will likewise be seen that I have such a structure that all of the compound pulley sheave members may be of comparatively large size and that excessive side diversion or fleeting angle of the running parts with respect to the sheaves from which they extend may be avoided without the use of pivoted sheave members.

It is also to be understood that while I have shown an operative device for the reeving of ten running parts of the line, that my invention is applicable to reeving of either more or less running parts dependent only on the number of parallel compound pulley sheave members utilized in the crown block.

It will be understood that wherever the claims, to follow, specify hoisting drums either on opposite sides or adjacent sides of the base of a derrick, one of the drums mentioned may be replaced by an anchorage means other than a drum without departing from the spirit of my invention, and also that one of the drums may constitute the anchorage means.

Furthermore, the anchorage means may be on the traveling block if desired.

There are obviously numerous other advantages which will be apparent from the preceding description and need not be further mentioned at this point.

I claim:

1. In a crown block structure for use on a derrick, a plurality of upright rotatable sheaves comprising a sheave adapted to be secured and rotate in a vertical plane disposed obliquely to the vertical planes in which all other sheaves in the structure lie, means for rotatably mounting said obliquely disposed sheave, and means for rotatably mounting all of the other sheaves therein.

2. A crown block structure embodying a compound pulley standing block unit having a plurality of parallel sheaves, supporting means therefor, and sheave means complemental thereto disposed in obliquely fixed transverse relation to said plurality of parallel sheaves, and supporting means for the last said sheave means.

3. A crown block structure adapted to be mounted on a derrick comprising a compound pulley standing block unit consisting of a plurality of sheaves lying in vertical planes parallel to each other, and sheave means lying in a vertical plane obliquely transverse relatively of the said plurality of sheaves.

4. A crown block structure adapted to be mounted on a derrick comprising a compound pulley standing block unit consisting of a plurality of rotatably mounted sheaves lying in vertical planes parallel to each other, a rigid mounting for securing said sheaves in said planes, complementary rotatable sheave means lying in a vertical plane obliquely transverse relatively of the said plurality of sheaves, and a rigid mounting for securing said sheave means in said obliquely transverse vertical plane.

5. A crown block structure adapted to be mounted on a derrick comprising a compound pulley standing block unit consisting of a plurality of rotatably mounted sheaves lying in vertical planes parallel to each other, a mounting for securing said sheaves in said planes, sheave means lying in a vertical plane obliquely transverse relatively of the first said vertical planes, and a mounting for securing said sheave means in said obliquely transverse vertical plane.

6. A crown block construction comprising a compound pulley standing block unit consisting of a plurality of rotatably mounted sheaves lying in vertical planes parallel to each other, a mounting for securing said sheaves in said planes, sheave means lying in a vertical plane obliquely transverse relatively of the first said vertical planes, a mounting for fixedly securing said sheave means in said obliquely transverse vertical plane, and base members for supporting said unit.

7. A device of the class described comprising a plurality of substantially upright independently rotatable compound pulley sheaves, mounting means therefor, a mounting, a complemental obliquely disposed sheave supported in a position thereon to rotate about a substantially horizontal axis, and means for attaching the last said mounting to the upper portion of the first said mounting means.

8. A crown block structure for derricks comprising a compound pulley standing block unit embodying an oblique sheave member and a plurality of parallel sheave members, base beams, means for supporting the said parallel sheave members from the said base beams, and means independent of the said supporting means for the said parallel sheave members for supporting said oblique sheave member from the said base beams.

9. A crown block structure embodying a compound pulley standing block unit having a plurality of upright rotatable sheaves disposed in vertical planes parallel to each other, mounting means adapted to be rigidly secured for rotatably supporting said sheaves in said planes, complemental rotatable sheave means disposed in a vertical plane obliquely transverse relative to the planes in which the first said sheaves lie, and mounting means adapted to be rigidly secured for rotatably supporting the said complemental sheave means in the said relative obliquely transverse position.

10. A crown block structure for well derricks comprising a plurality of parallel compound pulley sheave members, a sheave member mounted in oblique relation thereto, and means for simultaneously adjusting said parallel sheave members and said oblique sheave member to alter their position with relation to the center of the well.

11. A crown block structure adapted to be mounted on a well derrick embodying a compound pulley standing block unit comprising a plurality of sheaves disposed in parallelism and sheave means mounted in obliquely transverse relation thereto, supporting means for said unit including base beams, and means to adjust all of said sheaves and said sheave means as a unit with respect to the said base beams to alter their position with relation to the center of a well.

12. A crown block structure adapted to be mounted on a well derrick and embodying a compound pulley standing block unit having sheaves with their axes disposed in different horizontal planes, supporting means for said standing block unit including base beams, and unitary means for adjusting all of the said sheaves with respect to the said base beams to alter their position with respect to the center of a well.

13. A crown block comprising a compound pulley standing block unit having a plurality of parallel sheaves, supporting means for the said sheaves, an obliquely crosswise sheave for cooperation with said parallel sheaves, supporting means for said oblique sheave, and for mounting the supporting means for rotary adjustment to occupy various fixed positions.

14. A compound pulley standing block comprising a plurality of parallel sheaves and complementary sheave means disposed in obliquely transverse relation to the first said sheaves, supporting means for the first said sheaves, supporting means for the said obliquely transverse sheave means, and means for mounting the last said supporting means in different obliquely angular positions relative to the first said sheaves.

15. In a crown block organization, a compound pulley standing block unit comprising the combination of a plurality of sheaves adapted to be disposed in parallelism and sheave means complemental thereto adapted to be disposed in obliquely angular relation to the first said sheaves, the central vertical axis of the said sheave means being substantially coincident with the central vertical axis of the first said sheaves, means for rotatably supporting the first said sheaves and maintaining same in parallelism, and means for rotatably supporting said sheave means and maintaining same in any selected obliquely angular position relative to the first said sheaves.

16. In a crown block organization, a compound pulley standing block unit comprising a plurality of sheave members having their axes adapted to be disposed in parallelism and a complementary sheave member having its axis adapted to be disposed in obliquely angular relation to the first said axes, the central vertical axis of the said sheave being substantially coincident with the central vertical axis of the said plurality of sheaves, means for rotatably supporting the first said sheaves and maintaining the axes thereof in parallelism, and means for rotatably supporting the said complementary sheave member and maintaining its axis in any selected obliquely angular position relative to the said axes of the first said sheaves.

17. A crown block structure for derricks comprising a compound pulley standing block unit consisting of a plurality of independently rotatably parallel sheaves and a complementary oblique sheave member, supporting means for the said parallel sheave members and supporting means for the said oblique sheave, the last said means comprising bearing means for the rotatable support of the said sheave, means extending downwardly from said bearing means for the support thereof, a supporting plate upon which the last said means is mounted, and a skeleton leg structure upon which said supporting plate is mounted.

18. A crown block structure for derricks comprising a compound pulley standing block unit consisting of a plurality of independently rotatable parallel sheaves and a complementary oblique sheave member, supporting means for the said parallel sheaves and supporting means for the said oblique sheave, the last said means comprising bearing means for the rotatable support of the said sheave, means extending downwardly from said bearing means for the support thereof, a supporting plate upon which the last said means is mounted, and means for supporting said plate.

19. A crown block structure for derricks comprising a compound pulley standing block unit consisting of a plurality of independently rotatable parallel sheaves and a complementary oblique sheave member, supporting means for the said parallel sheaves, a supporting plate, a conical sheave carrying member for said oblique sheave member carried upon said supporting plate, and means for supporting said plate.

20. A crown block comprising in a compound pulley standing block unit for operation with a derrick structure wherein the ends of a hoisting line rove thereto are led downwardly therefrom to adjacent sides of the derrick, a plurality of sheaves arranged in parallelism and a complemental sheave in fixed oblique relation thereto, and an idler pulley co-operable with said compound pulley standing block unit for fair leading one of the said downwardly led ends of a hoisting line from one of said parallel sheaves to one of the adjacent sides of the derrick.

21. A crown block structure embodying a compound pulley standing block unit having a plurality of upright rotatable sheaves disposed in vertical planes parallel to each other, mounting means adapted to be rigidly secured for rotatably supporting said sheaves in said planes, and complemental rotatable sheave means disposed in a vertical plane obliquely transverse relative to the vertical planes in which the first said sheaves lie, mounting means adapted to be rigidly secured for rotatably supporting the said complemental sheave means in the said relative transverse position, a rotatable grooved fair leader co-operative with the said standing block unit for fair leading a downwardly extending end of a hoisting line therefrom, and a mounting adapted to be rigidly secured for rotatably supporting said fair leader.

22. A crown block organization embodying a compound pulley standing block unit comprising a plurality of upright rotatable sheaves disposed in substantial parallelism to each other and supporting means therefor for operation in a derrick structure and adapted to have a hoisting line rove thereto and the ends thereof led downwardly therefrom off from over certain of the said parallel sheaves to winding drum-anchorage means horizontally close to the base of the derrick, an idler fair leader pulley supplementary to the said parallel sheaves for fair leading one downwardly led end of a hoisting line rove thereto to winding drum-anchorage means on one side of the base of the derrick, the other downwardly led end of the same hoisting line fair leading naturally off from over another of the said parallel sheaves to winding drum-anchorage means on an adjacent side of the base of the derrick, supporting means for the said idler fair leader pulley, and means for mounting the said supporting means for adjustment of the said idler fair leader pulley to different positions traversely of the face width of the said parallel sheaves to fair lead a hoisting line from different ones of the said parallel sheaves.

23. A crown block comprising a compound pulley standing block unit for operation with a derrick structure wherein the ends of a hoisting line rove thereto are led downwardly therefrom to adjacent sides of the derrick, having a plurality of sheaves arranged in parallelism and a complemental sheave in fixed oblique relation thereto, and an idler pulley for fair leading one of the said downwardly led ends of the hoisting line from one of the said parallel sheaves to one of the adjacent sides of the derrick, supporting means for the said idler pulley, and means for mounting the said supporting means for adjustment of the said idler pulley to different positions to fair lead from different ones of said parallel sheave members.

24. A crown block for a derrick comprising a compound pulley standing block unit including co-operative sheave means consisting of a plurality of rotatably mounted sheaves lying in vertical planes parallel to each other, a mounting for securing said sheaves in said planes, sheave means lying in a vertical plane obliquely transverse relatively of the first said vertical planes, a mounting for fixedly securing said sheave means in said obliquely transverse vertical plane, base members for supporting said unit, and vertical spacing means for supporting the said base members above the level of the water table beams of a derrick.

25. A crown block construction for a derrick embodying an assembly of co-operative sheave means including a plurality of rotatably mounted sheaves lying in vertical planes parallel to each other, a mounting for securing said sheaves in said planes, sheave means lying in a vertical plane obliquely transverse relatively of the first said vertical planes, a mounting for fixedly securing the second said sheave means in the second said vertical plane, base members for supporting said assembly, vertical spacing means for supporting the said base members of the said assembly a substantial distance above the horizontal head of a derrick, a rotatably mounted fair leader supplemental to said assembly of co-operative sheave means, and a mounting for said fair leader secured to the said vertical spacing means.

26. A crown block construction for a derrick embodying an assembly of co-operative sheave means comprising a plurality of rotatably mounted sheaves lying in vertical planes parallel to each other, a mounting for securing said sheaves in said planes, sheave means lying in a vertical plane obliquely transverse relatively of the first said vertical planes, a mounting for fixedly securing the second said sheave means in the second said vertical plane, base members for supporting said assembly, vertical spacing means for supporting said assembly, including the said base beams, above the level of the tops of the water table beams of a derrick, a rotatably mounted fair leader supplemental to said assembly of co-operative sheave means, and a mounting for said fair leader secured to the said vertical spacing means, said mounting for said fair leader including means for adjustably supporting the fair leader for adjustment thereof to different positions to fair lead from different sheaves of said assembly.

27. A crown block structure embodying a compound pulley standing block unit having a plurality of upright rotatable sheaves disposed in vertical planes parallel to each other, mounting means adapted to be rigidly secured for rotatably supporting said sheaves in said planes, complemental rotatable sheave means disposed transversely relative to the first said sheaves and in a vertical plane obliquely angular thereto, mounting means adapted to be rigidly secured for rotatably supporting the said complemental sheave means in the said transversely relative position, a rotatable grooved fair leader co-operative with the said standing block unit for fair leading a downwardly extending end of a hoisting line therefrom, and rigidly secured mounting means for rotatably supporting said fair leader, said mounting having means for securing same in different positions traversely of the face width of the first said sheaves for co-operation of said fair leader with different sheaves thereof.

28. In means to increase the head room for the operation of a compound pulley traveling block in a well derrick, a crown block structure embodying a compound pulley standing block unit including beams and sheaves supported therefrom, and means including beams for supporting the said beams of the standing block unit from the water table of the derrick, said supporting means being of such structure that the said sheaves are so spaced above the water table that the upper portion of the traveling block may be operatively raised above the level of the second said beams.

29. In a crown block organization, the combination with the water table beams of a derrick, of a compound pulley standing block assembly for co-operation with an underlying compound pulley running block assembly, and means for supporting the first said assembly from the said water table beams, with the sheaves thereof a substantial distance above said water table beams so as to provide a space between the level of the tops of the said water table beams and the lower portions of the said standing block in the region of the sheaves thereof for the accommodation of the said running block.

30. In a crown block structure, a compound pulley standing block unit comprising a plurality of parallel sheaves, means for operatively supporting said sheaves including base beams for the unit, means for supporting the said base beams a substantial distance above the level of the horizontal head of a derrick, said supporting means comprising hinges and means to attach said hinges to the horizontal head of a derrick, the said hinges being adapted to swing the said base beams from their normal operative position to a position which will permit the unobstructed passage of the said parallel sheaves and base beams through the water table opening of a derrick.

31. In a crown block, a compound pulley standing block unit comprising a plurality of parallel sheaves, means for operatively supporting the said sheaves, including base beams, means for operatively supporting the said base beams above the level of the horizontal head of a derrick comprising beams, hinges, and means to attach the said hinges to the said horizontal head of the derrick, one of the members of each of the said hinges having releasable clamp means for attaching its knuckle portion thereto, the said beams being slidably and pivotally movable from their normal operative position to a position permitting the unobstructed passage of the said parallel sheaves and the said base beams of the compound pulley standing block unit through the water table opening of a derrick.

32. In a crown block structure adapted to be mounted on a well derrick, a compound pulley standing block unit comprising a plurality of parallel sheaves, means for operatively supporting the said sheaves including base beams for the unit, and means for supporting the said base beams above the level of the water table of the derrick, said means being pivotally mounted so that they may be moved to a position to permit the passage of the said assembly through the water table opening of the derrick.

33. The combination with the horizontal head of a derrick, the same having a vertical opening passing therethrough, of means for vertically spacing a crown block structural unit above the head and including spaced base members co-operable with the head, means for slidably and hingedly mounting said base members for movement in a horizontal direction and for vertical swinging movement, respectively, and means for securing the members against movement.

34. The combination with the horizontal head of a derrick, the same having a vertical opening passing therethrough, of means for vertically spacing a crown block structural unit above the head and including spaced base members co-operable with the head, and means for hingedly mounting said base members for vertical swinging movement relative to said opening.

35. The combination with the horizontal head of a derrick, the same having a vertical opening passing therethrough, of means for vertically spacing a crown block structural unit above the head and including spaced base members co-operable with the head, and means for slidably attaching said base members for movement relative to a central plane of the said opening.

36. The combination with the horizontal head of a derrick, the same having a vertical opening passing therethrough, of means for vertically spacing a crown block structural unit above the head and including spaced base members co-operable with the head, means for slidably attaching said base members for movement relative to a central plane of said opening, a plurality of struts mounted on the respective base members for independent adjustment of the individual struts to and from the longitudinal centers of the said base members, and means to operatively secure the said struts to the said base members.

37. The combination with the top of a derrick, the same having an opening through which a structural unit of a crown block is adapted to be hoisted to a position above the opening, of means for spacing and supporting a structural unit on said top and including a plurality of attached laterally tiltable base beams disposed at respective sides of a central plane of the opening, and pairs of unit supporting struts mounted on and adjustable longitudinally of said beams and superposed relatively thereto.

38. A crown block comprising spaced base members to be mounted directly on the derrick, a plurality of struts supported on each of said base members and adjustable independently of each other to and from the longitudinal center of said base members, spaced beams supported by said struts, intermediate transverse beams supported by said spaced beams, spaced beam plates extending between said transverse beams, sheave supporting means carried by said beam plates and a plurality of sheaves supported by said means.

39. A crown block comprising a compound pulley standing block unit including base beams therefor, means including beams and struts adapted to support the said base beams of the standing block unit a substantial distance above the horizontal head of a derrick and in any one of two positions to render said standing block unit operative in co-operation both with a derrick wherein the ends of a line of said compound pulley lead to adjacent sides of the derrick base and with a derrick wherein the ends of the hoisting line of the said compound pulley lead to opposite sides of the derrick base.

40. A crown block comprising a compound pulley standing block unit including base beams therefor, and means including beams adapted to support the said base beams a substantial distance above the horizontal head of a derrick and in any one of two positions so that when in one position the first said beams are disposed at right angles to the second said beams and when in the other position the first said beams are disposed in parallelism with the second said beams.

41. A crown block comprising a compound pulley standing block unit including base beams therefor, means adapted to support said base beams from the water table beams of a derrick, and vertically space same a substantial distance thereabove, and means for detachably securing the supporting and spacing means to said base beams, so that the said base beams of the said unit are adapted to be lowered into close relation to the water table beams of a derrick.

42. In a crown block for use on a derrick, a plurality of upright rotatably mounted sheaves including standard cable-drilling rig sheaves and compound pulley standing block sheaves, the last named sheaves comprising a sheave adapted to rotate in a vertical plane disposed obliquely to the vertical planes in which all the other sheaves in said block rotate.

43. A crown block structure embodying compound pulley standing block sheave means and standard cable-drilling rig sheave means, the said compound pulley standing block sheave means comprising three or more sheave members including sheaves disposed in parallelism and complemental sheave means disposed obliquely transverse thereto and symmetrically of the central vertical axis thereof, and the said standard cable-drilling rig sheave means being disposed radially of the said central vertical axis.

44. A combination crown block comprising a plurality of compound pulley standing block sheaves with supporting means therefor, and a standard cable-drilling rig sheave structure comprising a drilling line sheave, a sand sheave and supporting means including spaced beams for supporting the said sheaves, said standard rig sheave structure and supporting means being disposed below the compound pulley standing block sheaves and applicable to and removable from the crown block without disturbing the compound pulley sheaves or their supporting means.

45. In a combination crown block for a well derrick, a compound pulley standing block unit spaced vertically above the level of the water-table beams of a derrick and standard cable-drilling rig sheaves disposed at the level of the water-table beams including a drilling line sheave and a sand sheave installed for operation entirely independently of the supporting structure for the compound pulley standing block unit.

46. A combination crown block comprising a compound pulley standing block unit having a plurality of parallel sheaves and supporting means therefor for operation in a derrick structure and adapted to have a hoisting line rove thereto and the ends thereof led downwardly therefrom off from over certain of the said parallel sheaves to winding drums on adjacent sides of the base of the derrick and an idler fair leader pulley supplementary to the said parallel sheaves thereof for fair leading one downwardly led end of a line to a winding drum on one side of the base of the derrick, the other downwardly led end of the same line fair leading naturally to a winding drum on an adjacent side of the derrick, supporting means for the said idler fair leader pulley, and a standard cable-drilling rig sheave supporting structure, said standard cable-drilling rig sheave supporting structure being adapted to be mounted for operation and dismounted from operative position independently of the said supporting means for the said parallel sheaves and independently of the supporting means of the said supplementary idler fair leader pulley.

47. In a crown block structure adapted to be mounted on a derrick, a compound pulley standing block unit, having a plurality of sheaves, standard cable-drilling rig sheaves, and base members supporting all of the aforesaid sheaves, certain of the sheaves of the said compound pulley standing block unit being disposed in different horizontal planes and the standard cable-drilling rig sheaves being disposed in a horizontal plane distinct from the said different horizontal planes in which the said compound pulley standing block sheaves lie.

48. A crown block structure adapted to be mounted on a well derrick comprising a compound pulley standing block unit having a plurality of sheaves, certain of said sheaves being disposed in different horizontal planes, supporting means for said unit including base beams, a plurality of standard cable-drilling rig sheaves, supporting means for said standard cable-drilling rig sheaves, means for rigidly suspending the last said supporting means from the first said supporting means, and means for simultaneously adjusting the positions of all of said sheaves relatively of said base beams.

49. In a crown block structure adapted to be mounted on a derrick, a compound pulley standing block unit embodying a plurality of sheaves, a plurality of standard cable-drilling rig sheaves, and base members supporting all of the aforesaid sheaves, certain of the sheaves of the compound pulley standing block unit being disposed in different horizontal planes and the standard cable-drilling rig sheaves being disposed in a horizontal plane distinct from the said different horizontal planes in which the said compound pulley standing block sheaves lie, and unitary means for adjusting the position of said compound pulley standing block sheaves and said standard cable-drilling rig sheaves relatively to said base members.

50. A crown block for a combination hydraulic-rotary and standard cable-drilling rig, comprising a compound pulley standing block unit, supporting means therefor including beams adapted to be mounted directly on the horizontal head of a derrick, a plurality of standard cable-drilling rig sheaves including a drilling-rope sheave and a sand line sheave, supporting means for the last named sheaves including beams, and means for suspending the last named beams from the first said supporting means.

51. A crown block for a combination hydraulic-rotary and standard cable-drilling rig, comprising a compound pulley standing block unit, supporting means therefor adapted to be mounted directly on the horizontal head of a derrick, a plurality of standard cable-drilling rig sheaves including a drilling-rope sheave and a sand line sheave, supporting means for the last named sheaves, and means for rigidly suspending the last named supporting means from the first said supporting means, the last named means comprising interposed sectional members for varying the elevation of the second said sheaves.

52. A crown block for a combination hydraulic-rotary and standard cable-drilling rig comprising a compound pulley standing block unit, supporting means therefor adapted to be mounted directly on the horizontal head of a derrick, a plurality of standard cable-drilling rig sheaves and supporting means for the last named sheaves, the last named supporting means being suspended from the first said supporting means and detachably connected therewith.

53. A crown block for a combination hydraulic-rotary and standard cable-drilling rig having a compound pulley standing block unit comprising a plurality of parallel sheaves, supporting means for the said unit adapted to be mounted directly on the horizontal head of a derrick, a plurality of standard cable-drilling rig sheaves, supporting means for the last named sheaves, and means including beams for rigidly suspending the last named supporting means from the first said supporting means, the ends of the beams of the last named supporting means being adapted to be disposed between vertical planes coincident with a plurality of running parts of a hoisting line when said parts extend downwardly from diametrically opposed points of sheaves of the compound pulley standing block unit when the latter is rove for co-operative association with a travelling block unit of a compound pulley.

54. A crown block for a combination hydraulic-rotary and standard cable-drilling rig, comprising a compound pulley standing block unit having co-operable sheaves disposed in different horizontal planes, and a plurality of standard cable-drilling rig sheaves disposed in a horizontal plane beneath the horizontal plane of the sheaves of the said standing block unit, the sheaves in each of the said horizontal planes being disposed in a vertical plane angular to the vertical plane in which the sheaves in the other said horizontal planes are disposed.

55. A crown block for a combination hydraulic-rotary and standard cable-drilling rib comprising a compound pulley standing block unit including co-operable horizontal sheave-supporting axles, one of which is disposed obliquely transverse of the other, respective co-operable related sheaves rotatable on said axles and including a plurality of sheaves on one axle disposed in vertical planes and in parallelism with each other and standard cable drilling rig sheave means which underlie said standing block unit including a drilling line sheave and a sand sheave, the axis of each of which is disposed in a horizontal plane beneath the horizontal planes in which the said axles of said standing block unit lie.

56. A crown block for a combination hydraulic-rotary and standard cable-drilling rig comprising a compound pulley standing block sheave assembly and a standard cable-drilling rig sheave assembly, means for operatively supporting the said standard cable-drilling rig sheave assembly, and means for operatively supporting a plurality of parallel sheaves in the compound pulley standing block sheave assembly in a horizontal plane directly above the said standard cable drilling rig sheave assembly, all of said sheaves being disposed in parallelism.

57. A crown block for a combination hydraulic-rotary and standard cable-drilling rig comprising a compound pulley standing block unit, drilling line and sand line sheaves, said standing block unit including upper and lower sheave means, the latter being intermediately disposed relative to the said drilling line and sand line sheaves and the said upper sheave means, the central vertical axis of the upper sheave means being coincident with the central vertical axis of said intermediately disposed sheave means, and the said drilling and sand line sheaves being disposed radially of said central vertical axis.

58. A crown block adapted to be mounted on the horizontal head at the top of a derrick including two sections to be mounted on the head, one section extending directly over the other, sheave means carried by the lower section, and sheave means disposed in different horizontal planes carried by the upper section.

59. A crown block adapted to be mounted on the horizontal head at the top of a derrick including two sections to be mounted on the head, one section extending directly over the other, sheave means carried by the lower section, and sheave means having their axes disposed in different horizontal planes carried by the upper section.

60. A crown block adapted to be mounted on the horizontal head at the top of a well derrick including two sections to be mounted on the head, one section extending directly over the other, sheave means carried by the lower section, sheave means having their axes disposed in different horizontal planes carried by the upper section, and unitary means in said upper section to adjust the sheaves to alter their position with respect to the central vertical axis of the derrick.

61. A crown block adapted to be mounted on the horizontal head at the top of a derrick including two sections to be mounted on the head, one section extending directly over the other and being demountable independently of the other, sheave means carried by the lower section, and sheave means having their axes disposed in different horizontal planes carried by the upper section.

62. A crown block adapted to be mounted on the horizontal head at the top of a well derrick including two sections to be mounted on the head, one section extending directly over the other and being demountable independently of the other, sheave means carried by the lower section, sheave means disposed in different horizontal planes carried by the upper section, and unitary means in said upper section to adjust the sheaves therein to alter their position with respect to the central vertical axis of the derrick.

63. A crown block adapted to be mounted on the horizontal head at the top of a well derrick including two sections to be mounted on the head, one section extending directly over the other and being demountable independently of the other, sheave means carried by the lower section, sheave means disposed in different horizontal planes carried by the upper section, and means whereby the sheaves in said upper section are simultaneously adjustable to alter their position with respect to the central vertical axis of the derrick.

64. A crown block comprising base beams, a plurality of parallel sheave members, a plurality of beam plates alternating with said sheave members, and intermediate spaced transverse beams supported by said base beams, said sheaves and beam plates being supported on said transverse beams by the ends of said beam plates.

65. A crown block comprising base beams, a plurality of parallel sheave members, a plurality of beam plates alternating with said sheave members, and intermediate spaced transverse beams supported by said base beams, said sheaves and beam plates being supported on said transverse beams by the under parts of the ends of the said beam plates.

66. A crown block structure comprising a plurality of parallel sheaves, beam plates between which the said sheaves are disposed and from which said sheaves are rotatably supported, ears on said beam plates, intermediate spaced transverse beams supporting said ears, and base beams supporting said transverse beams.

67. A crown block comprising beams adapted to be mounted on a derrick, intermediate spaced transverse beams supported by first said beams, spaced beam plates spanned across over and extending downwardly between said intermediate beams, means for rotatably supporting sheaves carried by said beam plates, and a plurality of sheaves rotatably supported by said means.

68. A crown block organization comprising a plurality of parallel sheaves, a plurality of beam plates from which the sheaves are rotatably supported, and means for supporting said plates, the supporting points of the said means being higher than the axes of said sheaves.

69. A crown block organization adapted to be mounted on the water table of a derrick comprising a plurality of parallel sheave members, a plurality of spaced beam members disposed in alternating relation with the said sheave members, means for binding and spacing the said beam members, means for the rotatable support of the said sheave members carried by the said beam members, and supporting means operatively correlated with the respective ends of the said beam members and adapted to be interposed intermediately the said ends and the water table of a derrick to support the said beam and sheave assembly, the axes of the said sheaves being disposed in a horizontal plane below the horizontal plane co-incident with the tops of the last said means.

70. A structure for mounting on a derrick including base members adapted to be disposed on the water table of the derrick, supporting means extending upwardly from said base members, spaced beams supported by said supporting means, intermediate transverse beams supported by said spaced beams, spaced beam members extending between and supported by the said intermediate transverse beams, sheave supporting means carried by the third said beams, and a plurality of sheaves supported by the last said supporting means.

71. A structure for mounting on a derrick including base members for attachment to the derrick, supporting means extending upwardly from said base members, spaced beams supported by said supporting means, intermediate transverse beams supported by said spaced beams, spaced beam plates extending between and supported by said transverse beams, sheave-supporting means carried by said beam plates, a plurality of sheaves supported by said means, and unitary means whereby the sheave and plate structure carried by said supported spaced beams is adjustable in opposite directions horizontally.

72. A crown block organization adapted to be mounted on the water table of a derrick comprising a plurality of parallel sheave members, a plurality of spaced beam members disposed in alternating relation with the said sheave members, means for binding and spacing said beam members, means for the rotatable support of the said sheave members carried by the said beam members, supporting means operatively correlated with the respective ends of the said beam members and adapted to be interposed intermediately the said ends and the water table of a derrick to support the said sheave and beam assembly, the axes of the said sheaves being disposed in a horizontal plane below the horizontal plane co-incident with the tops of the last said means, and means to stiffen the said beam members disposed at points along the span thereof intermediate the vertical planes co-incident with the last said means.

73. A crown block structure comprising base beams, intermediate transverse beams supported by said base beams, spaced beam plates extending between said intermediate beams, the bottom and top contour lines of the said structure being formed by the bottom edges of the said base beams and the top edges of the said beam plates, respectively, the said beam plates being apertured for the reception of means to rotatably support associated sheaves, means to rotatably support sheaves carried in said apertures and a plurality of sheaves supported thereby, the said aperture in the said beam plates being so positioned relative to the top and bottom contour lines of the structure that a sheave supported by the said means and having a diameter approximately equal to the distance between the said contour lines will have its top and bottom edges disposed adjacent to the said lines.

74. A crown block comprising beams adapted to be mounted on a derrick, intermediate spaced transverse beams supported by first said beams, spaced beam plates spanned between said intermediate beams and supported thereby, means for rotatably supporting sheaves carried by said beam plates, a plurality of sheaves disposed in alternating relation with said beam plates carried by the said means, and means disposed on the tops of the said beam plates to stiffen them.

75. A crown block structure comprising a plurality of parallel sheaves having rope grooves formed on the peripheries thereof, a rope guard located for cooperation with said rope grooves of said sheaves, to prevent the parts of a hoisting line rove thereto from becoming displaced therefrom, a plurality of plates alternating with said sheaves, means at either end of the said plates for spacing and binding said plates, and means carried by said rope guard for stiffening said plates, said rope guard being disposed along the length of the said plates intermediate the said binding and spacing means.

76. A crown block construction comprising a plurality of spaced beam plates for supporting sheaves disposed therebetween, means adjacent either end of the said plates for supporting and spacing same, and means to stiffen the said plates along the span thereof intermediate the said spacing means, the last said means consisting of a member adapted to be disposed on the upper edges of the said plates and having slots formed on a side thereof adapted to engage and stiffen the said plates.

77. A crown block construction comprising a plurality of spaced beam plates, for supporting sheaves disposed therebetween, sheaves rotatably supported therebetween, means adjacent either end of the said plates for supporting and spacing same, and means to stiffen the said plates along the span thereof intermediate the said spacing means, the last said means consisting of a member adapted to be disposed on the upper edges of the said plates and having slots formed on a side thereof adapted to engage and stiffen the said plates and grooves formed on the said side alternately of the said slots and adapted for cooperation with the peripheries of the said sheaves to guard ropes operatively rove through the grooves thereof.

78. A crown block structure comprising base beams, intermediate transverse beams supported directly on the first said beams, means connecting said intermediate beams against separation, spaced beam members extending between said intermediate beams, means for rotatably supporting sheaves carried by said beam members, a plurality of sheaves rotatably supported thereby, legs extending upwardly from the means connecting the intermediate transverse beams, support means for upper sheave means attached to the upper extremities of said legs, intermediate support means for the upper sheave means extending upwardly from said support means, means for rotatably supporting the upper sheave means supported by said intermediate means, and upper sheave means rotatably supported thereby disposed directly above the first said sheaves.

79. A crown block structure comprising an assembly of normally horizontal beams adapted to operatively support a sheave supporting assembly, said structure comprising means adjacent one of its ends adapted to engage the parts of a snubbing rope, and rope receiving grooves adapted to assist in centering a hoisting rope for hoisting said structure.

80. A crown block structure comprising spaced beam members, sheaves, means for rotatably supporting said sheaves, and a spreader for said spaced beam members having a bitt portion carried thereby.

81. A crown block structure comprising spaced beam members, a spreader for said spaced beam members having a bitt portion carried thereby, and a crown block body portion having rope receiving grooves formed therein to assist in centering a hoisting rope for hoisting said crown block body.

82. A crown block structure comprising spaced beam members, a spreader for said spaced beam members having a bitt portion carried thereby, and a lug means carried on said bitt portion for centering the parts of a snubbing rope.

83. A crown block structure comprising spaced beam members, a spreader for said spaced beam members having a bitt portion carried thereby, a lug means carried on said bitt portion for centering the parts of a snubbing rope, and a crown block body portion having rope receiving grooves therein to assist in centering a hoisting rope for hoisting said crown block body.

84. A crown block structure comprising spaced beam members, a spreader for said spaced beam members having a bitt portion carried thereby, a lug means carried on said bitt portion for centering the parts of a snubbing rope, and a crown block body portion having rope guiding means for cooperation with said lug means in centering a hoisting rope for hoisting said crown block body.

85. A crown block comprising a structure including spaced beam members, a spreader for said spaced beam members, and bitt means carried by said spreader to engage the parts of a snubbing rope to center the bight thereof whereby to center a hoisting line with respect to the center of gravity of said structure to raise said structure to operative position on the top of a derrick.

86. A crown block structure comprising sheaves, spaced base beam members, a spreader for said spaced base beam members, and bitt means carried by said spreader adapted to engage a snubbing rope, said bitt means being located centrally of said structure in a transverse direction so that a snubbing rope when installed thereon will be disposed centrally in the said direction with respect to a center of gravity of said structure.

87. A crown block structure comprising spaced beam members, a spreader for said spaced beam members, and bitt means adjacent to one end of said spaced beams adapted to engage the parts of a snubbing rope to center a hoisting line with respect to a center of gravity of said crown block, said bitt means having sufficient clearance about its sides to enable the said snubbing rope to be applied and manipulated.

88. A crown block comprising a structure including spaced beam members, means to space said beam members apart, means adjacent the ends of the said beams to engage the parts of a snubbing rope to center the bight thereof whereby to center a hoisting line with respect to a center of gravity of said structure to raise said structure to operative position on the top of a derrick, said means for engagement with the snubbing rope being so formed as to facilitate the paying out of a snubbing rope therefrom and devoid of angles capable of causing injury to such a snubbing rope when same is paid out to permit the said structure to assume its normal horizontal position.

89. A crown block structure comprising spaced beam members, the length of said beam members being of a dimension greater than the width of said structure, a spreader for said spaced beam members, and bitt means carried by said spreader to engage the parts of a snubbing rope, said bitt means being adaptable to receive the parts of a snubbing rope which may be installed thereon so that the vertex of the bight thereof formed by said parts will be substantially co-incident with the center of gravity of said structure in one direction and that the said parts may be so adjusted that the said vertex of the said bight may be brought into a position substantially co-incident with the center of gravity of the said crown block in another direction, whereby the said crown block structure may be suspended by a hoisting line, snubbed by such snubbing rope, in a position substantially on end relative to its normal operative position, for hoisting through an opening having members disposed on opposite sides thereof to normally support said crown block in operative position.

90. A crown block structure comprising spaced beam members, said beam members being of a greater length than the width of the structure, a spreader at either end of said spaced beam members, and means on one of said spreaders to bitt a snubbing rope to center a hoisting line with respect to certain centers of gravity of said crown block structure, whereby the said crown block structure may be suspended in a vertical position substantially ninety degrees from its normal, operative, horizontal position, for hoisting through an opening having means disposed on opposite sides to normally support said crown block in operative position, the first said means being so formed as to facilitate the paying out of a snubbing rope therefrom and devoid of angles, whereby a snubbing rope may be caused to be paid out from said means without injury to such snubbing rope.

91. A crown block structure including normally horizontal spaced beam members, and bitt means embodied in the structure and disposed adjacent one end of the said structure and adapted for bitting a snubbing rope, to snub a hoisting line when the latter is attached symmetrically of and leads from the center of gravity of the said structure when the structure is disposed in its normal position, to a position where the said hoisting line will lead symmetrically from the center of gravity of the said structure when the horizontally disposed members thereof are suspended from the hoisting line in a vertical position.

92. A crown block structure comprising an assembly of normally horizontal beam members, and means to space said beam members apart, said assembly comprising means adjacent an end of said beam assembly to engage the parts of a snubbing rope to center the bight thereof whereby to substantially center a hoisting line with respect to the center of gravity of said crown block structure when said horizontal beams are in a substantially vertical position, to install said crown block in operative position on the top of a derrick.

93. A crown block structure comprising a beam assembly including a plurality of spaced beam members normally disposed in a horizontal plane, spacer elements for spacing said beams apart, the length of said beams being of a dimension greater than the width of said structure, and means disposed adjacent to an end of said beam assembly to engage the parts of a snubbing rope and to center the bight thereof at a point co-incident with the center of the structure from side to side thereof and to permit the length of the said parts forming the said bight to be adjusted in relation to a hoisting line secured to the said structure symmetrically of its central vertical axis whereby such hoisting line may be snubbed to a position co-incident with the center of gravity of said crown block structure when said horizontal beams are disposed in a substantially vertical position, whereby said crown block structure may be suspended in a position substantially perpendicular to its normal operative position and hoisted through an opening having means on opposite sides thereof to support the said spaced beam members in their normally horizontal operative position.

94. A crown block structure comprising a plurality of spaced beam members normally disposed in a horizontal position, spacer elements for spacing said beams apart, the length of said beams being of a dimension greater than the width of said structure, and means disposed adjacent to an end of said beams to engage the parts of a snubbing rope and to center the bight thereof at a point co-incident with the center of the structure from side to side thereof and to permit the length of the parts forming the bight thereof to be adjusted in relation to a hoisting line secured to the said structure symmetrically of its central vertical axis whereby, such hoisting line may be snubbed to a position substantially co-incident with the center of gravity of said crown block structure when said normally horizontal beams are disposed in a substantially vertical position, whereby said crown block structure may be suspended in a position substantially perpendicular to its normal operative position and hoisted through an opening having side members on opposite sides thereof to normally support said horizontal beams of the crown block structure in operative position, said means being so formed as to facilitate the paying out of a snubbing rope therefrom and devoid of angles capable of causing injury to such a snubbing rope when same is paid out to permit the said crown block structure to assume its normal horizontal position.

95. In combination in a crown block, a pair of supported beams, a sheave mounted for rotation between said beams, and means to truss the tops and bottoms of said beams at points vertically co-incident with the axial center of the said sheave.

96. In combination in a crown block, a pair of supported beams, a sheave mounted for rotation between said beams, and means disposed vertically co-incident with the axial center of the said sheave for exactly spacing and rigidly binding the tops and bottoms of said beams.

97. In combination in a crown block, a pair of supported beams, a sheave mounted for rotation between said beams, and means to truss the tops and bottoms of said beams at points vertically co-incident with the axial center of the said sheave, said means being adapted to be adjusted simultaneously with the said sheave to different positions along the length of said beams.

98. In combination in a crown block, a pair of supported beams, means disposed on the tops of said beams to receive and support a shaft, a sheave mounted for rotation on said shaft, and means co-acting with the first said means to truss the said beams at points on the tops and bottoms thereof vertically coincident with the plane of the axis of the said sheave.

99. In combination in a crown block, a pair of supported beams, means to truss the tops of the said beams, said means comprising means to rotatably support a sheave between said beams, means to truss the bottoms of said beams carried thereby, means to retain the last said means against dropping away from a position adjacent to the bottoms of the said beams while operatively assembling same, and means to operatively connect the said top and bottom truss means.

100. In combination in a crown block a pair of supported beams, a sheave mounted for rotation between said beams, means to truss the tops of said beams, and means to truss the bottoms of said beams, the said truss means being disposed symmetrically of a vertical plane coincident with the axis of the said supported sheave and adjustable with the said sheave along the length of the said beams.

101. In combination in a crown block, a pair of supported beams, bearings supported on the said beams, a shaft supported on the said bearings, means for retaining the said shaft against rotation, means for retaining the said shaft against longitudinal movement transversely relative to the said beams, under side portions of the said bearings having slots formed therein to embrace the tops of the said beams and co-acting with the said shaft to truss the tops of the said beams relative to each other, and means co-acting with the said bearings to truss the bottoms of the said beams relative to each other.

102. In combination in a crown block, a shaft, a sheave mounted for rotation on said shaft, bearing means at either end of the said shaft for supporting same and comprising means to retain same against rotation, means co-acting with the said shaft and the said bearing to prevent longitudinal movement of the said shaft transversely of the said beams, under side portions of the said bearings having slots formed therein adapted to embrace the tops of supporting beams, a supporting beam for each of the said bearings, downwardly extending legs on each of the said bearings having lower portions with threaded apertures formed therein, a bar member having recesses formed on either end and on the upper sides thereof to embrace the bottoms of the said beams, and means co-acting with the said bar member and the said bearings to clamp the latter in operative position on the said beams.

HARRY TALMAGE NICHOLS.